United States Patent [19]

Iwafune et al.

[11] Patent Number: 5,880,720
[45] Date of Patent: Mar. 9, 1999

[54] TELEVISION SYSTEM FOR PROVIDING INTERACTIVE TELEVISION PROGRAMS AND SERVER SYSTEM FOR CONSTRUCTING THE TELEVISION SYSTEM

[75] Inventors: Seiji Iwafune, Kanagawa-ken; Masahito Takeda, Tokorozawa; Toshiyuki Takada; Isamu Miura, both of Tokyo, all of Japan

[73] Assignee: Kabushiki Kaisha Toshiba, Kawasaki, Japan

[21] Appl. No.: 686,141

[22] Filed: Jul. 24, 1996

[30] Foreign Application Priority Data

| Jul. 26, 1995 | [JP] | Japan | 7-190728 |
| Dec. 11, 1995 | [JP] | Japan | 7-321702 |
| Dec. 11, 1995 | [JP] | Japan | 7-321704 |
| Mar. 14, 1996 | [JP] | Japan | 8-057532 |

[51] Int. Cl.⁶ ............................................. H04N 7/16
[52] U.S. Cl. .......................... 345/327; 348/12; 348/13; 345/200.49
[58] Field of Search ............................. 348/1, 12, 13, 348/7, 14, 15, 16, 17; 455/2, 5.1, 4.2, 6.3; 395/200.49; 345/327; H04N 7/16

[56] References Cited

U.S. PATENT DOCUMENTS

| 5,257,099 | 10/1993 | Morales-Garza | 348/12 |
| 5,410,326 | 4/1995 | Goldstein . | |
| 5,438,355 | 8/1995 | Palmer | 348/1 |
| 5,640,192 | 6/1997 | Garfinkle | 348/1 |
| 5,675,738 | 10/1997 | Suzuki et al. | 348/6 |

FOREIGN PATENT DOCUMENTS

| 2 283 398 | 5/1995 | United Kingdom . | |
| WO 95/01058 | 1/1995 | WIPO | H04N 7/16 |
| WO 95/101058 | 1/1995 | WIPO . | |
| WO 95/15658 | 6/1995 | WIPO . | |

*Primary Examiner*—Nathan Flynn
*Attorney, Agent, or Firm*—Oblon, Spivak, McClelland, Maier & Neustadt, P.C.

[57] ABSTRACT

A television system in which two-way television sets communicate with a server via a communication network. Each interactive television includes a program control unit for controlling interactive data exchange between a viewer, a response receiving unit for identifying a response from the viewer to the program from input signals to the television, and a communication control unit for controlling communications with other nodes. The server includes a communication control unit for controlling communications with other nodes, a program information DB storing procedures in units of programs, a response processing function for arranging response data in units of programs.

21 Claims, 24 Drawing Sheets

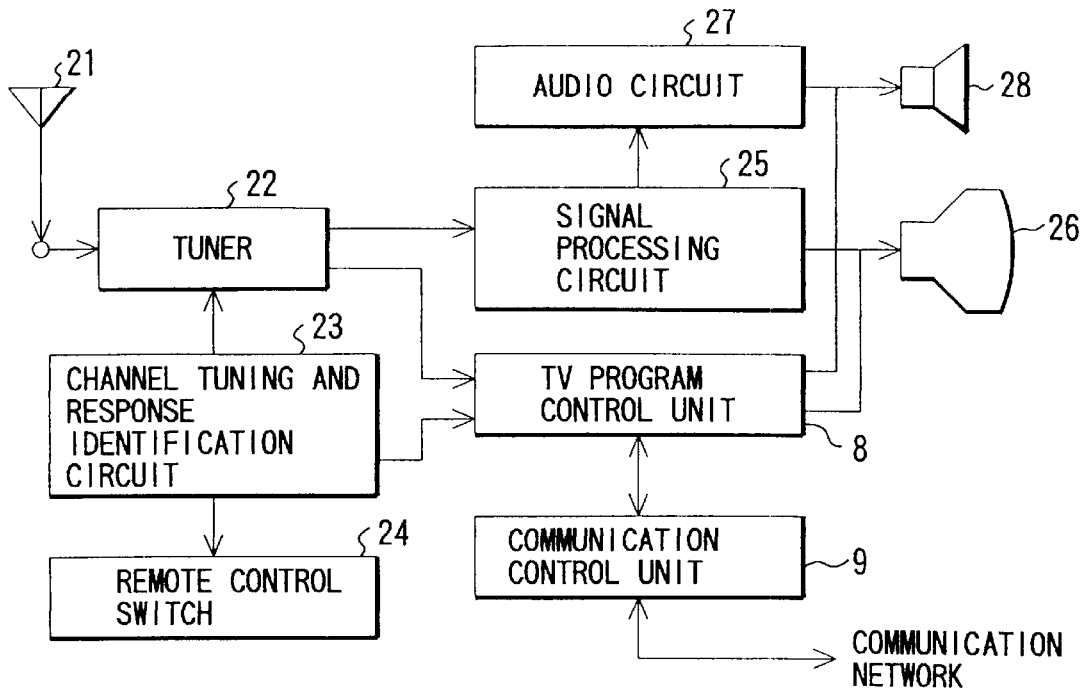
F I G. 3
| TV PROGRAM ID XXX | TV PROGRAM ID XXX | | | | |
|---|---|---|---|---|---|
| BROAD-CASTING TIME | CONTENTS OF RESPONSE PROCESSING | DATA HOLDING LIMIT | RESPONSE TIME | CONTENTS OF TOTALIZATION DATABASE | TRANS-MISSION TYPE |
|  |  |  |  |  |  |
F I G. 4
AUTHENTICATION INFORMATION DATABASE
| TELEVISION ID | NAME | ADDRESS | |
|---|---|---|---|
|  |  |  |  |
|  |  |  |  |
F I G. 5

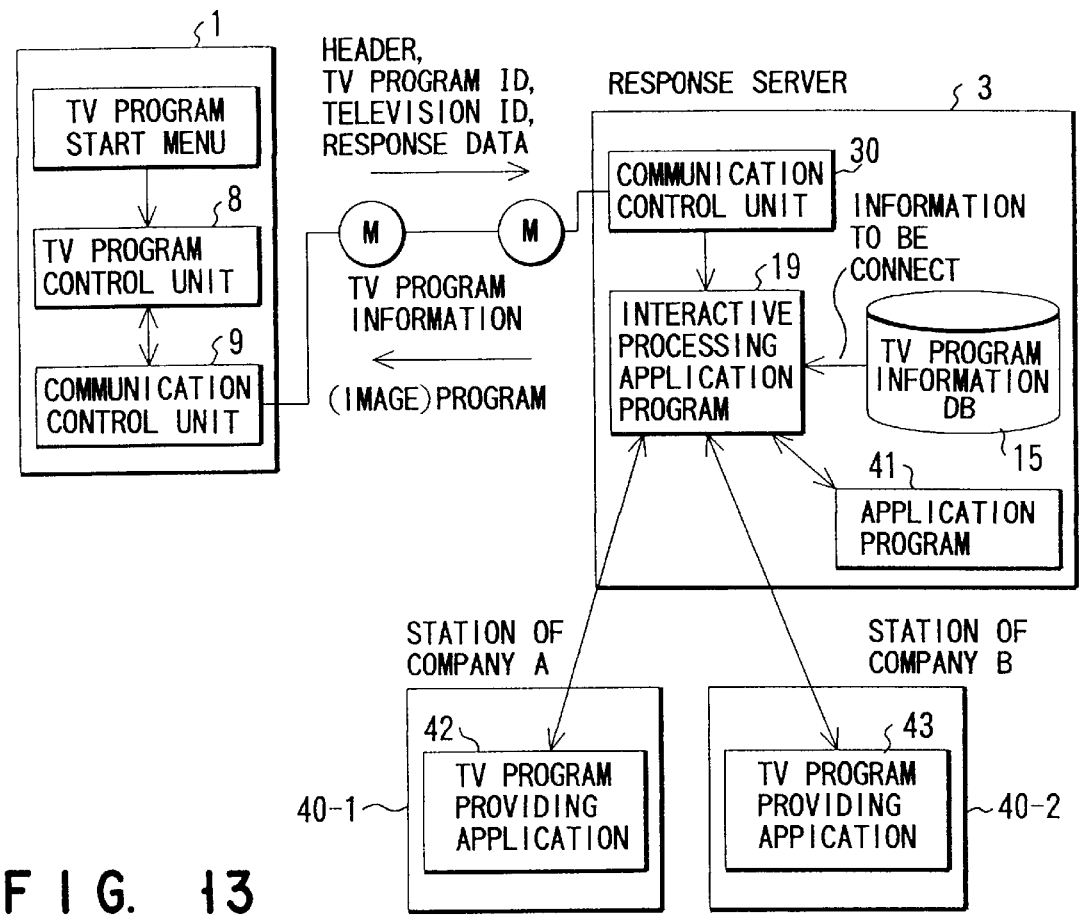
F I G. 13
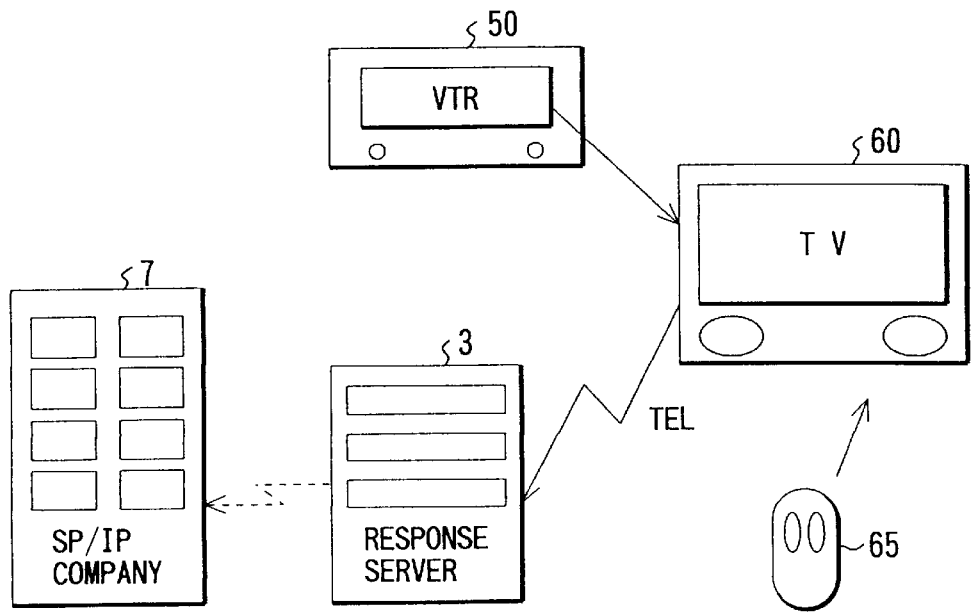
F I G. 14

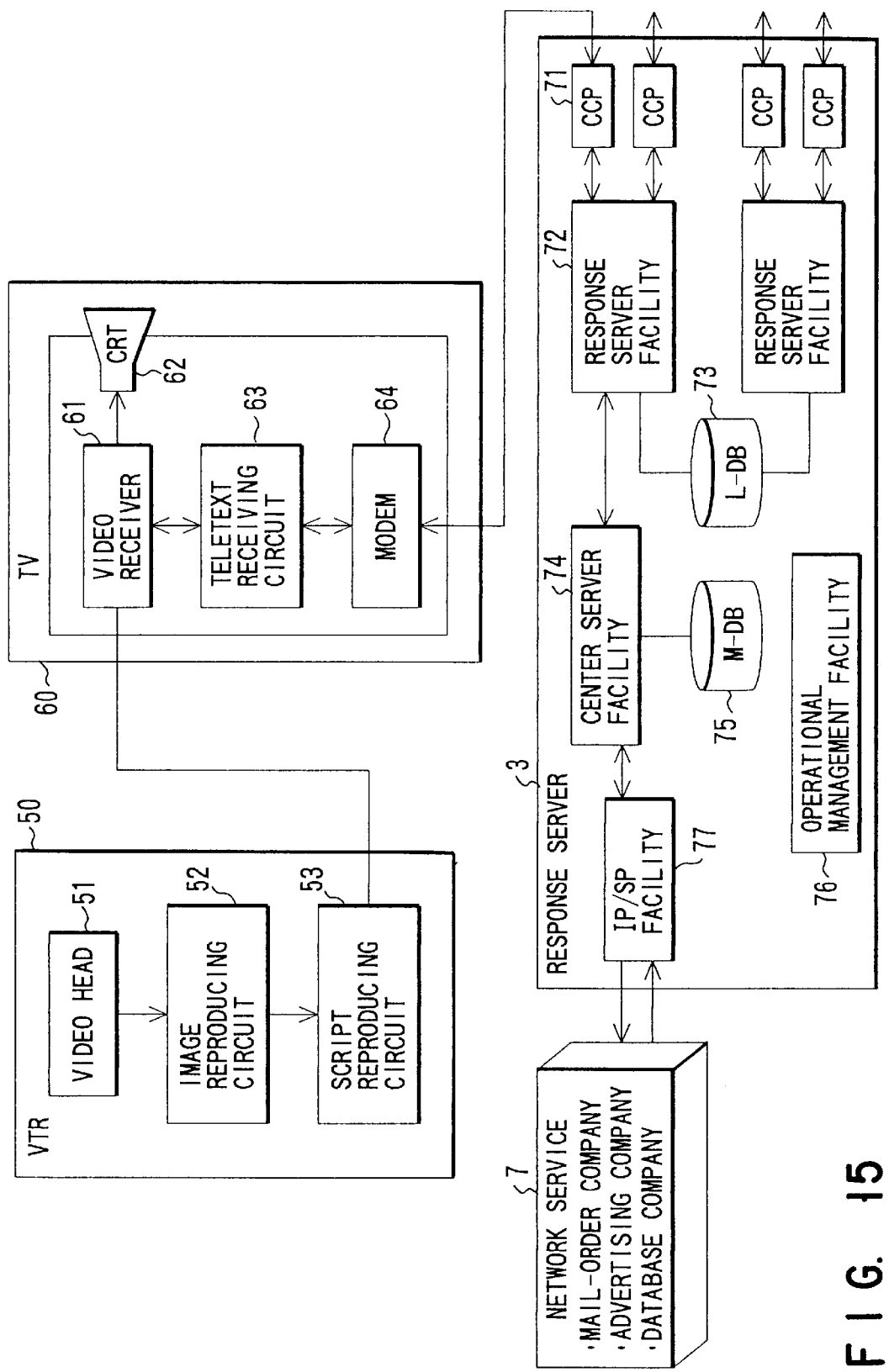
F I G. 15

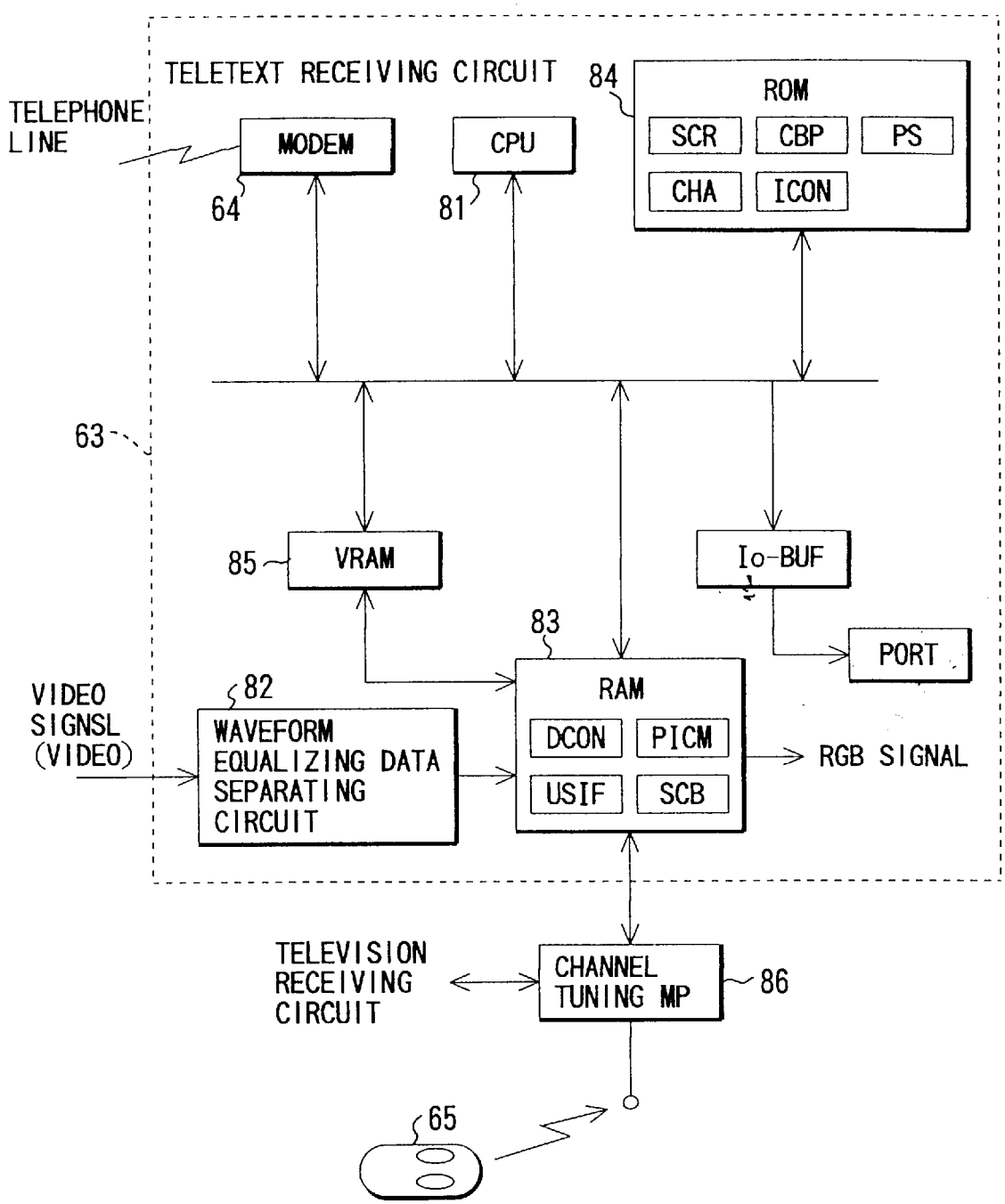
F I G. 16

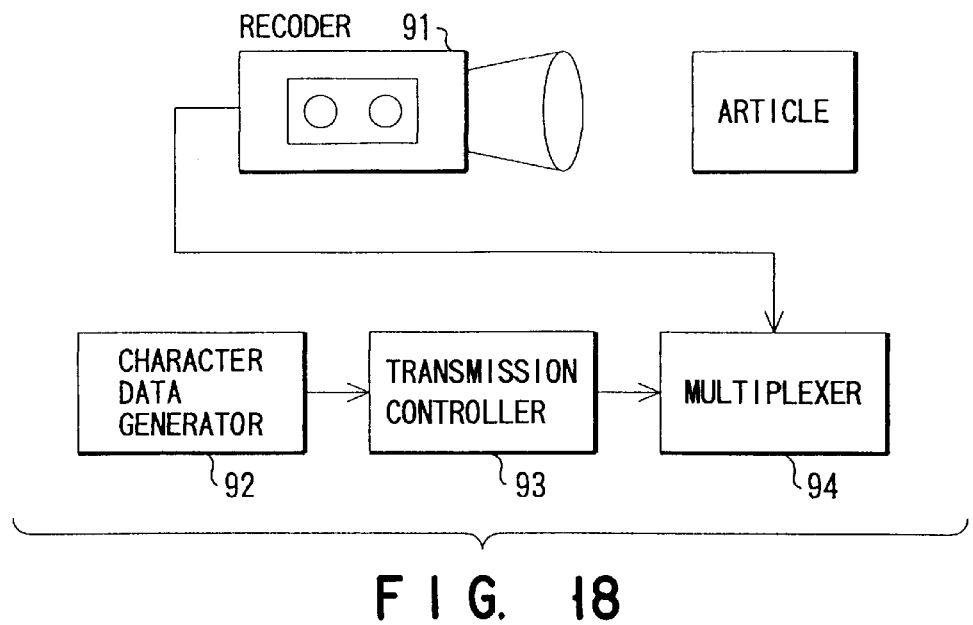
F I G. 18
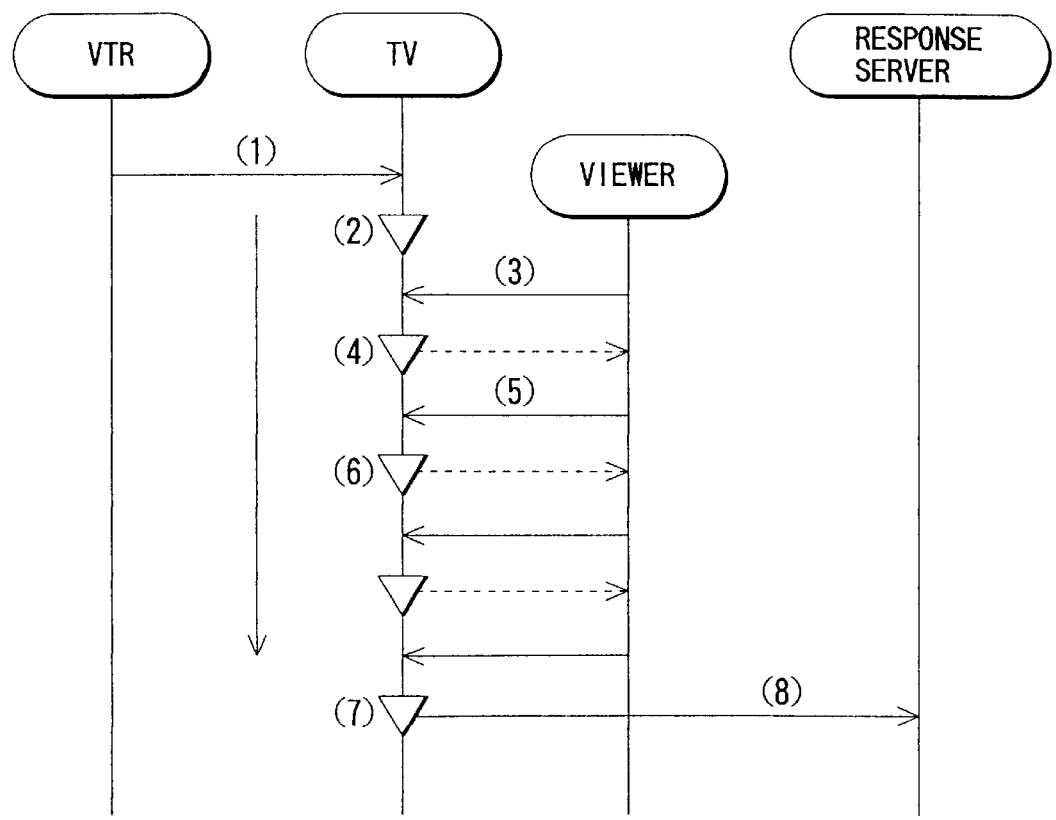
F I G. 19

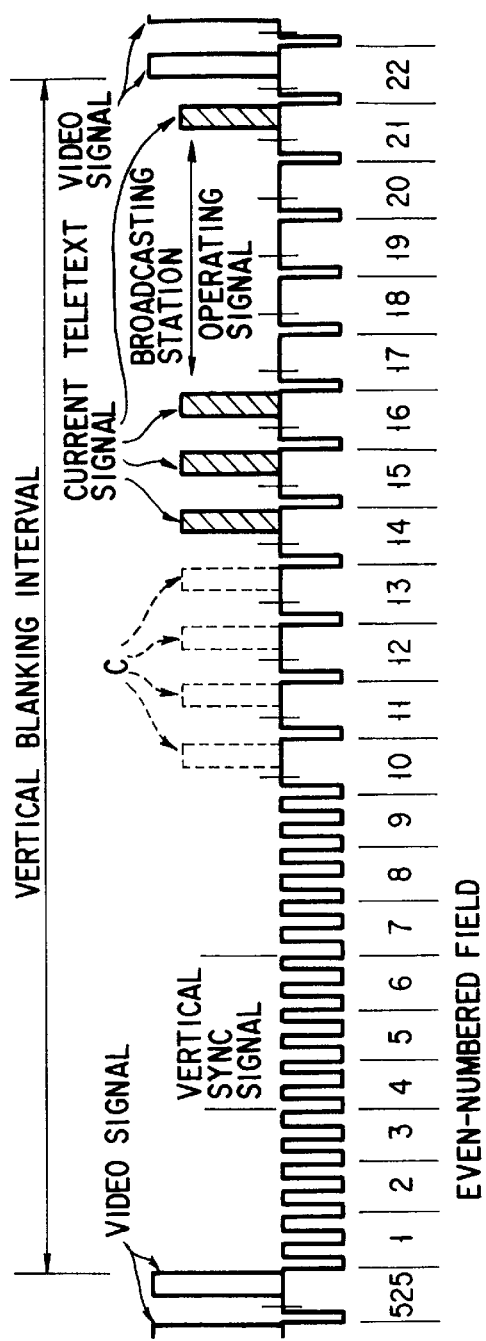
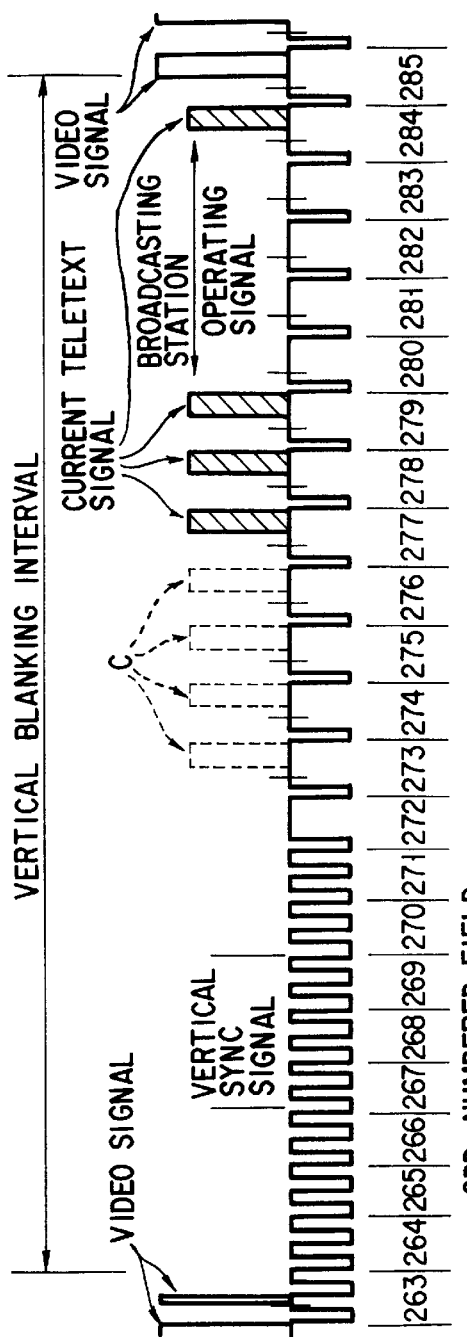
FIG. 20A
FIG. 20B

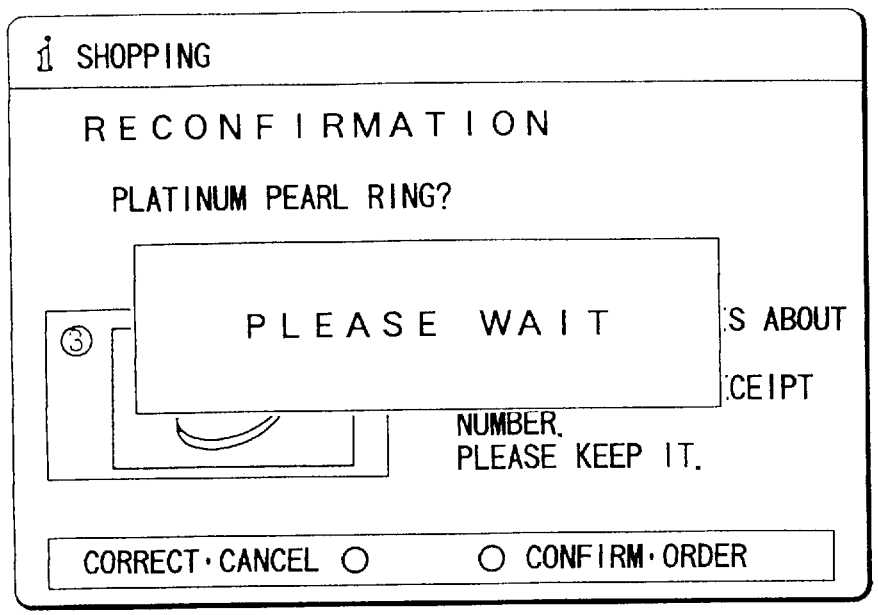
F I G. 23A
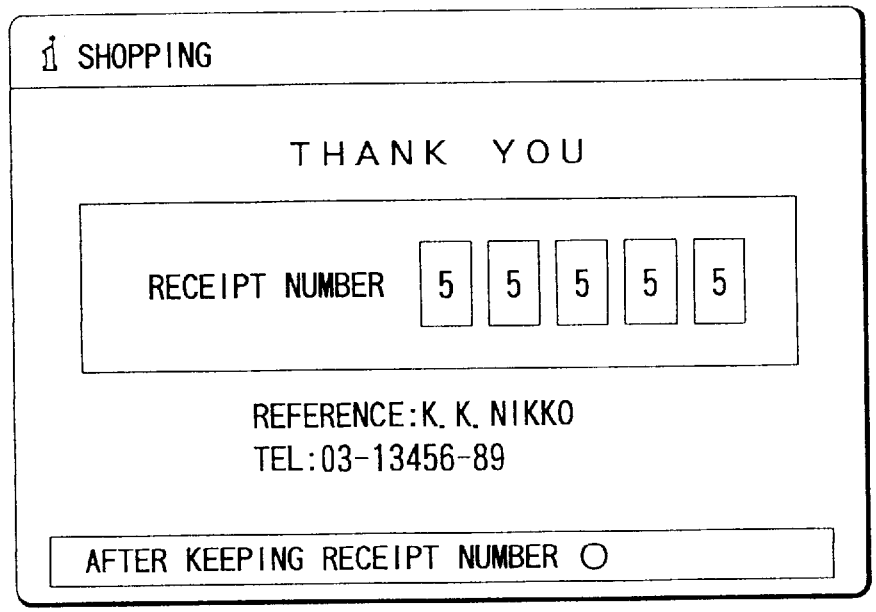
F I G. 23B

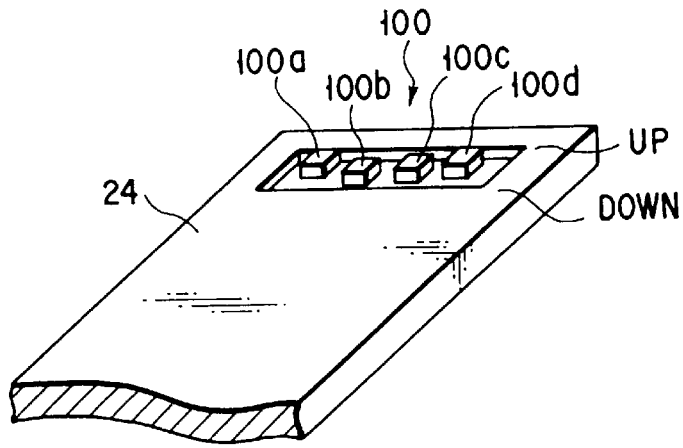
F I G. 25
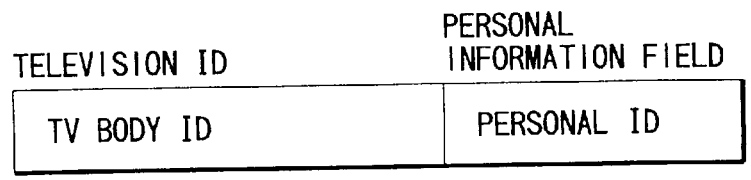
F I G. 26
AUTHENTICATION INFORMATION DATABASE
| TELEVISION ID | | NAME | ADDRESS | AGE | SEX | PASS-WORD | AREA CODE |
|---|---|---|---|---|---|---|---|
| TV BODY ID | PERSONAL ID | | | | | | |
| XXXX | 01 | TARO | | | | | |
| | 02 | HANAKO | | | | | |
| | 03 | | | | | | |
| YYYY | 01 | | | | | | |
| | 12 | | | | | | |
F I G. 27

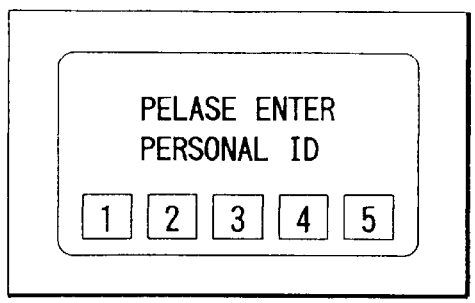
F I G. 31
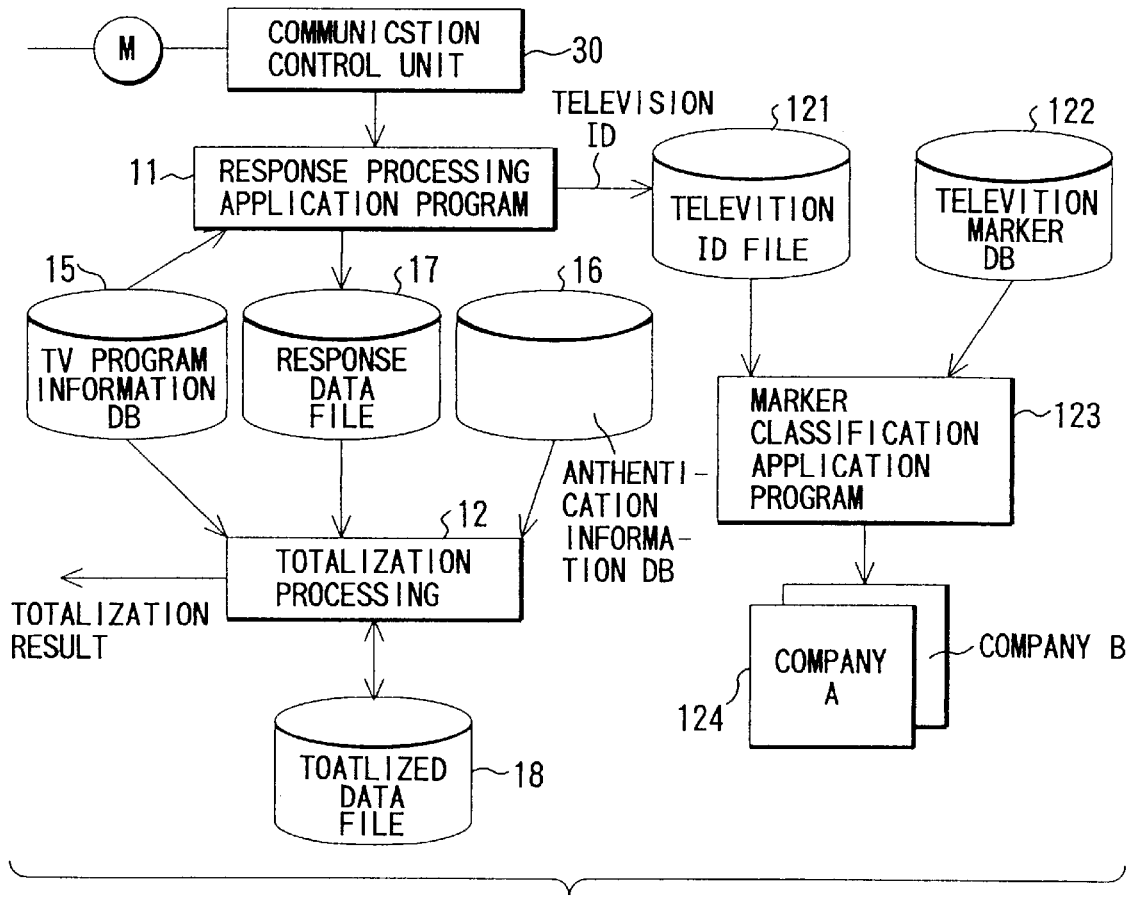
F I G. 32

FIG. 37A

⟨EXAMPLE 1⟩ TV PROGRAM ID=·····

| QUESTION NUMBER | RESPONSE TYPE | RESPONSE DATA LENGTH | NUMBER OF CHOICES | 1 | 2 | 3 | 4 | 5 | 6 |
|---|---|---|---|---|---|---|---|---|---|
| 1 | respond | 4 | 3 | 1 | 2 | 3 | | | |
| 2 | request | 4 | 4 | 4 | 5 | 6 | 7 | | |
| 3 | respond | 4 | 6 | 8 | 9 | 10 | 11 | 12 | 13 |
| 4 | request | 4 | 3 | 14 | 15 | 16 | | | |
| 5 | request | 4 | 5 | 17 | 18 | 19 | 20 | 21 | |

FIG. 37B

⟨EXAMPLE 2⟩ TV PROGRAM ID=xxxxx

| QUESTION NUMBER | RESPONSE TYPE | RESPONSE DATA LENGTH | NUMBER OF CHOICES | 1 | 2 | 3 | 4 | 5 | 6 |
|---|---|---|---|---|---|---|---|---|---|
| 1 | respond | 4 | 3 | 11 | 12 | 13 | | | |
| 2 | request | 4 | 4 | 21 | 22 | 23 | 24 | | |
| 3 | respond | 4 | 6 | 31 | 32 | 33 | 34 | 35 | 36 |
| 4 | request | 4 | 3 | 41 | 42 | 43 | | | |
| 5 | request | 4 | 5 | 51 | 52 | 53 | 54 | 55 | |

FIG. 37C

⟨EXAMPLE 3⟩ TV PROGRAM ID=△△△△△

| QUESTION NUMBER | RESPONSE TYPE | RESPONSE DATA LENGTH | NUMBER OF CHOICES | 1 | 2 | 3 | 4 | 5 | 6 |
|---|---|---|---|---|---|---|---|---|---|
| 1 | respond | 4 | 2 | A | B | | | | |
| 2 | request | 4 | 3 | C | D | E | | | |
| 3 | respond | 4 | 4 | F | G | H | I | | |
| 4 | request | 4 | 2 | J | K | | | | |
| 5 | request | 4 | 5 | L | M | N | O | P | |

FORMAT OF TOTALIZATION RESULT REQUEST STREAM

| COMMUNICA-TION HEADER | UIC | CN | L | R#1 | L | R#2 | ---- | L | R#n | M |
|---|---|---|---|---|---|---|---|---|---|---|

UIC: TV PROGRAM ID
CN : NUMBER OF REQUEST OBJECT RESPONSE DATA
L  : RESPONSE DATA LENGTH
R#n: RESPONSE DATA CHARACTER STRING
M  : PROCESSING METHOD

F I G. 38

PROCESSING METHOD: M

```
0x10: EACH RETURN RESULT FOR EACH REQUEST RESPONS DATA
0x20: SUM  RETURN SUN OF REQUEST RESPONSE DATA
0x30: AND  RETURN LOGICAL AND(ONLY LIST)OF REQUEST RESPONSE DATA
0x40: OR   RETURN LOGICAL OR(ONLY LIST)OF REQUEST RESPONS DATA

0x1 : NUMBER
0x2 : LIST(ONLY REQUEST AND ORDER ARE VALID)
0x3 : EXTRACT(RANDOMLY PICK UP ONE FROM RESULTANT OBJECTS)
```

F I G. 39

F I G. 40A

| COMMUNICA-TION HEADER | UIC | CN | L | R#1 | L | R#2 | L | R#3 | M |
|---|---|---|---|---|---|---|---|---|---|
| | 1 | 3 | 4 | 11 | 4 | 12 | 4 | 13 | 0x21 |

F I G. 40B

| COMMUNICA-TION HEADER | UIC | CN | L | R#1 | L | R#2 | L | R#3 | M |
|---|---|---|---|---|---|---|---|---|---|
| | 1 | 3 | 4 | 11 | 4 | 12 | 4 | 13 | 0x11 |

F I G. 40C

| COMMUNICA-TION HEADER | UIC | CN | L | R#1 | L | R#2 | M |
|---|---|---|---|---|---|---|---|
| | 1 | 3 | 4 | 21 | 4 | 23 | 0x12 |

F I G. 40D

| COMMUNICA-TION HEADER | UIC | CN | L | R#1 | L | R#2 | L |
|---|---|---|---|---|---|---|---|
| | 1 | 3 | 4 | 42 | 4 | 54 | 0x32 |

TELEVISION SYSTEM FOR PROVIDING INTERACTIVE TELEVISION PROGRAMS AND SERVER SYSTEM FOR CONSTRUCTING THE TELEVISION SYSTEM

BACKGROUND OF THE INVENTION

1. Field of the Invention

The present invention relates to a technique pertaining to an interactive television capable of selecting interactive TV programs in which a viewer can participate and, more particularly, to a television system for providing application services using the interactive TV set.

2. Description of the Related Art

In the field of television broadcasting in which radio waves are broadcast from broadcasting stations, television programs are selectively received by television receivers capable of receiving the broadcast radio waves, and television pictures of the selected television programs are displayed, teletext is performed by using areas between vertical retrace line intervals of television video signals. In this teletext, a large number of programs are multiplexed on broadcast radio waves and transmitted by the radio waves. On the receiver side, necessary programs are selectively received, converted into television picture signals, and displayed.

By the use of the technology of this teletext, it is possible to provide viewers with an arbitrary large number of text programs or programs containing moving pictures, in addition to regular television programs on broadcasting.

Unfortunately, the present television programs now on broadcasting one-sidedly provides information from broadcasting stations to viewers. For example, a viewer cannot selectively display supplementary information of an article which he or she desires from a plurality of articles introduced in a television program. It is not possible to call out to viewers in a television program, totalize responses from the viewers in real time, or reflect the result of totalization on the television program, either.

SUMMARY OF THE INVENTION

It is an object of the present invention to provide a television system for providing various application services which use response data sent from viewers to television programs by using television receivers capable of receiving broadcast radio waves and displaying television images.

The present invention provides a television system in which interactive televisions for selectively receiving a television program from broadcast radio waves communicate with a server via a communication network. The interactive television and the server have the following configurations.

The interactive television comprises a channel tuning circuit for switching a plurality of channels previously assigned with programs in order to select a program, the channels including a channel assigned with an interactive program for exchanging data in two ways between a viewer and the program, an interactive program control circuit for controlling the interactive data exchange between the viewer and the interactive television program in accordance with contents of the interactive television program, and forming response data containing a response input by the viewer to an item which prompts the viewer to input a response on the interactive television program, a response input circuit for identifying the response from the viewer to the interactive television program from a plurality of input signals to the interactive television, and transferring the response to the interactive television program control circuit, and a television communication control circuit for controlling communications to other nodes including the server performed via the communication network, the response data being contained in one of transmission data transmitted from the interactive television to the server.

The server comprises a server communication control circuit for controlling communications to other nodes including the interactive televisions performed via the communication network, a program information database for managing procedures relating to response data in units of programs, an application program for arranging the response data received from the interactive televisions in units of programs, and an application program for reading out procedures from the program information database and processing the response data arranged in units of programs in accordance with the procedures corresponding to the programs.

In this television system, the interactive program control circuit sets a program identifier of an interactive television program currently selected in response data containing a response from a viewer transferred from the response input circuit, the program information database stores a procedure of each program on the basis of the program identifier predetermined for the program, and the application program reads out a procedure of an interactive television program relating to response data from the program information database by using the program identifier set in the response data.

The server further comprises an authentication information database for managing authentication information of a user on the basis of a user identifier indicating a user of the interactive television, and an application program of retrieving the authentication information managed by the authentication information database by using the user identifier, the interactive program control circuit sets the user identifier indicating the user of the interactive television in response data containing a response from a viewer transferred from the response input circuit, the program information database manages a procedure including processing using user information, and the application program instructs extraction of user information if the procedure read out from the program information database includes processing using the user information.

The present invention also provides a server system to which interactive televisions for selectively receiving a program from broadcast radio waves are connected via a communication network, and to which response data relating to a response input by a viewer to an item prompting the viewer to input a response on an interactive television program allowing data exchange in two ways between viewers and the program is transmitted from an interactive television on which the interactive program is being executed.

This server system comprises a communication control circuit for controlling communications to other nodes including the interactive televisions performed via the communication network, a program information manager for managing procedures relating to response data in units of programs, a response processing application program for arranging the response data from the interactive televisions in units of programs, and a procedure executing application program for reading out the procedures from the program information manager and processing the response data for each program in accordance with the procedures corresponding to the programs.

In this server system, the response processing application program arranges the response data in a form of a response data list in which the response data are classified in accordance with a program, the program information database manages a procedure in which a method of totalizing the response data forming the response data list is determined for each program, and the procedure executing application program totalizes response data to each program in accordance with the procedure obtained from the program information database.

In this server system, the program information database manages a procedure associated with each program on the basis of a program identifier determined for the program, and the procedure executing application program reads out a procedure from the program information database by using the program identifier and processes response data in accordance with the readout procedure.

This server system further comprises an authentication information database for managing authentication information of a user on the basis of a user identifier indicating a user of the interactive television, and an application program of retrieving the authentication information managed by the authentication information database by using the user identifier.

The program information database manages a procedure including processing using user information, and the authenticating application program is instructed to extract user information if the procedure read out from the program information database includes processing using the user information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a functional block diagram of an interactive television used in the first embodiment;

FIG. 4 is a view showing the structure of a television program information database used in the first embodiment;

FIG. 5 is a view showing the structure of an authentication information database used in the first embodiment;

FIG. 13 is a view showing a detailed flow of the response data when the IP/SP server supplies a television program in the third embodiment;

FIG. 14 is a schematic view of a television system according to the fourth embodiment;

FIG. 15 is a functional block diagram of the television system according to the fourth embodiment;

FIG. 16 is a functional block diagram of an interactive television used in the fourth embodiment;

FIG. 18 is a view showing a video making system in the fourth embodiment;

FIG. 19 is a view showing the flow of data in the fourth embodiment;

FIG. 20A is a view showing even-numbered fields of a teletext signal;

FIG. 20B is a view showing odd-numbered fields of the teletext signal;

FIG. 23A is a view showing a screen displayed until the television is connected to the server in the television shopping program;

FIG. 23B is a view showing a purchase confirmation screen in the television shopping program;

FIG. 25 is a perspective view of switches of a remote control unit used in the fifth embodiment;

FIG. 26 is a view showing the data format of a part of response data used in the fifth embodiment;

FIG. 27 is a view showing the data structure of an authentication information database used in the fifth embodiment;

FIG. 31 is a view showing a screen for prompting input of a television ID in the fifth embodiment;

FIG. 32 is a functional block diagram of a server system according to the sixth embodiment;

FIGS. 37A to 37C are views showing the relationships between the choice numbers and the unique choice numbers of questions in different programs;

FIG. 38 is a view showing the format of a totalization result request stream;

FIG. 39 is a view showing a practical example of a processing method designated in the totalization result request stream; and FIGS. 40A to 40D are views showing practical examples of the totalization result request stream.

DETAILED DESCRIPTION OF THE PREFERRED EMBODIMENTS

Embodiments of the present invention will be described below.

(First Embodiment)

Figure 1:
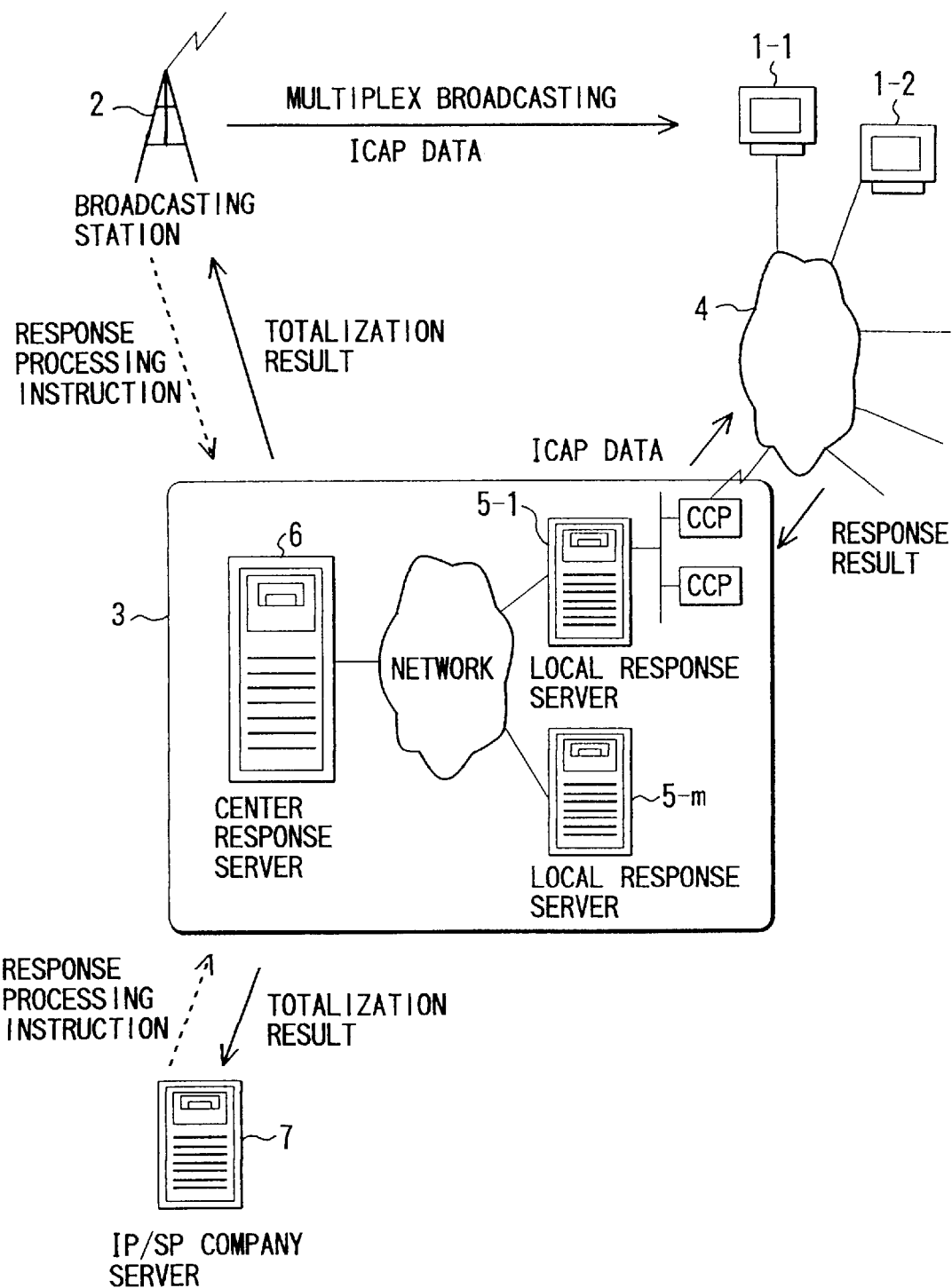
FIG. 1 is a schematic view of a television system according to the first embodiment.

FIG. 1 schematically shows a television system constructed of a plurality of interactive televisions and a response server. Each of interactive televisions 1-1 to 1-n has a function, as a television receiver, of receiving broadcast radio waves transmitted from a broadcasting station 2 and displaying a television program assigned to a selected channel, a function of separating an interactive television program, which is multiplexed on a regular television program by using a predetermined range of broadcast radio waves, from the broadcast radio waves, and providing the interactive television program, and a function of transmitting to the server a response from a viewer to the interactive television program.

These interactive televisions 1-1 to 1-n can be connected to the response server 3 via a public communication network 4. The response server 3 comprises a plurality of local response servers 5-1 to 5-m to which interactive televisions in previously allocated predetermined areas are connected, and a center response server 6 for managing these local response servers. Note that the local response server and the center response server can be regarded as one response server from the interactive televisions 1-1 to 1-n. In the following description, these servers are collectively called the response server 3 if it is unnecessary to distinguish between them.

The broadcasting station 2 and an IP/SP (information provider or service provider) company server 7 are connected to the response server 3 via a wide area communication network such as a WAN. Both the broadcasting station 2 and the IP/SP company server 7 connect to the response server 3 to receive data such as the result of totalization from the response server 3. The IP/SP company server 7 is managed by an information provider who wants to use processed data, such as the totalization result, acquired by the response server 3.

Figure 2:
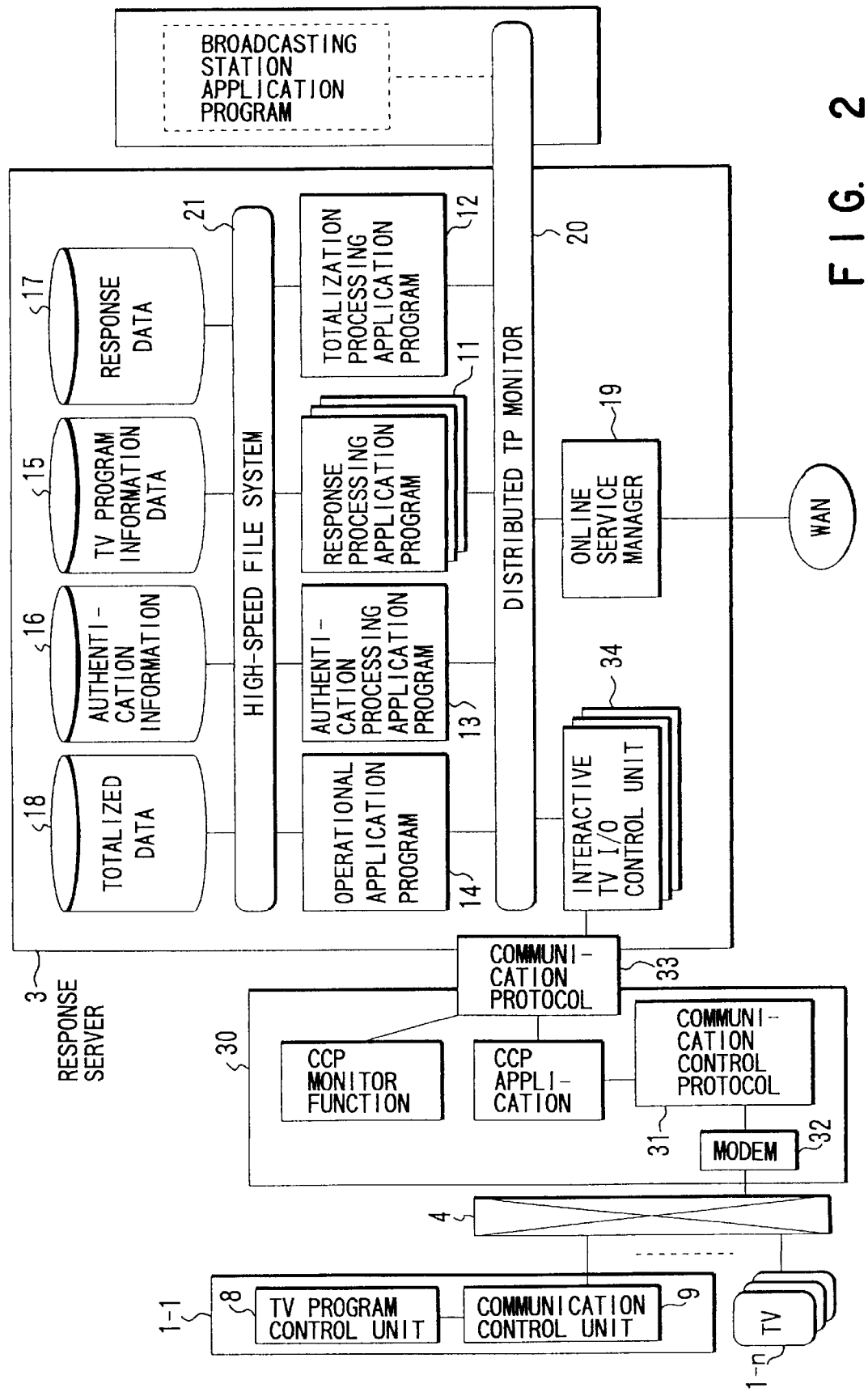
FIG. 2 is a functional block diagram of the television system according to the first embodiment.

FIG. 2 shows the software configurations of the interactive televisions 1 and the response server 3.

Each of the interactive televisions 1-1 to 1-n includes a television program control unit 8 and a communication control unit 9 as main constituent elements for providing interactive television programs. The television program control unit 8 controls the progress of an interactive television program transmitted by a multiplexed broadcasting system from the broadcasting station 2. The communication control unit 9 controls communication lines to other nodes, including the response server 3, via the public communication network 4.

FIG. 3 shows the internal structure of the interactive television 1. This interactive television 1 receives broadcast radio waves from a receiving antenna 21 and sends the received radio waves to a tuner 22. A channel selecting and response identification circuit 23 switches channels of the tuner 22. Instructions to the channel tuning and response identification circuit 23 are sent from a remote control switch 24. If a signal from the remote control switch 24 is a channel tuning signal, the channel tuning and response identification circuit 23 inputs the signal to the tuner 22. If a response to an interactive television program from a viewer is sent from the remote control switch 24, the channel tuning and response identification circuit 23 inputs the response to the television program control unit 8. A signal processing circuit 25 separates the signal supplied from the tuner 22 into a video signal and an audio signal. The signal processing circuit 25 inputs the video signal to a picture tube 26 for displaying pictures and the audio signal to an audio circuit 27 for outputting sounds. The television program control unit 8 progresses an interactive television program supplied from the tuner 22 by using program composition information (including a still or moving picture, audio information, image control information, and a script) of the program. By executing a program unit contained in the script, a video signal of the interactive television program is input to the picture tube, and an audio signal of the program is input to a loudspeaker. A whole bit stream (excluding partial control information) for displaying an interactive television program is called a script. Therefore, the script contains a header, a form, a resource, and the program portion.

With respect to an item displayed in an interactive television program to prompt a viewer to input a response, the viewer inputs a response by using the remote control switch 24. The television program control unit 8 receives the viewer's response from the channel tuning and response identification circuit 23 and forms response data by adding to the response the television program ID of the television program and the television ID of the interactive television.

Television program IDs are uniquely assigned to television programs provided by the interactive television. Television IDs are uniquely assigned to the interactive televisions 1-1 to 1-n.

The response server 3 includes a response processing application program 11, a totalization processing application program 12, an authentication processing application program 13, and an operational application program 14. The response processing application program 11 stores the response data sent from the interactive televisions 8 to a response data file 17 in the form of a file. The totalization processing application program 12 totalizes the response data stored in the response data file 17. The authentication processing application program 13 accesses an authentication information database 16 and extracts personal information. The operational application program 14 activates the application programs 11 to 14 at timings given by a scheduler or deletes unnecessary data from the response data file 17.

The response server 3 includes a television program information database 15 and the authentication information database 16. The television program information database 15 can be accessed from the response processing application program 11, the totalization processing application program 12, and the authentication processing application program 13. The authentication information database 16 can be accessed from the authentication processing application program 13.

The television program IDs of all television programs provided by the interactive television are registered in the television program information database 15. Necessary procedure data corresponding to the contents of services of these television programs are stored in a one-to-one correspondence with the television program IDs of the television programs. Personal information such as names and addresses are stored in the authentication information database 16 in a one-to-one correspondence with the television IDs of all interactive televisions previously registered.

A distributed TP monitor (distributed transaction process monitor) 20 is software which assures the continuity of data by monitoring the operations of the application programs 11 to 14. A high-speed file system 21 is software which is interposed between the application programs 11 to 14 and the databases 15 and 16, the data file 17, and a data file 18. The high-speed file system 21 improves the reliability and increases the processing speed.

A communication control unit 30 connects the response server 3 to the interactive televisions 1-1 to 1-n via the public communication network 4. The communication control unit 30 controls connections between the interactive televisions and a modem 32 and connects the interactive televisions connected to the modem 32 to the response server 3 via a communication protocol 33. The communication control unit 30 is connected to the response server 3 via an I/O control unit 34. The I/O control unit 34 efficiently processes data exchange with respect to the response server 3.

FIG. 4 shows the configuration of the program information database 15.

The program information database 15 stores a procedure for response data in an interactive television program relating to a service of "receiving answers from viewers in a quiz show by using interactive televisions and informing the broadcasting station 2 of the result of totalization of the viewers' answers". Data determined in the television program information database 15 are the television program ID of the program, the broadcasting time of the quiz show, and the procedure (including the method of arranging response data, the method of totalization, and the type of transmitting the totalization result).

FIG. 5 shows the configuration of the authentication information database 16.

The names of the owners of interactive televisions, the addresses of the owners, and other arbitrary attribute data are determined in a one-to-one correspondence with television IDs.

Figure 7:
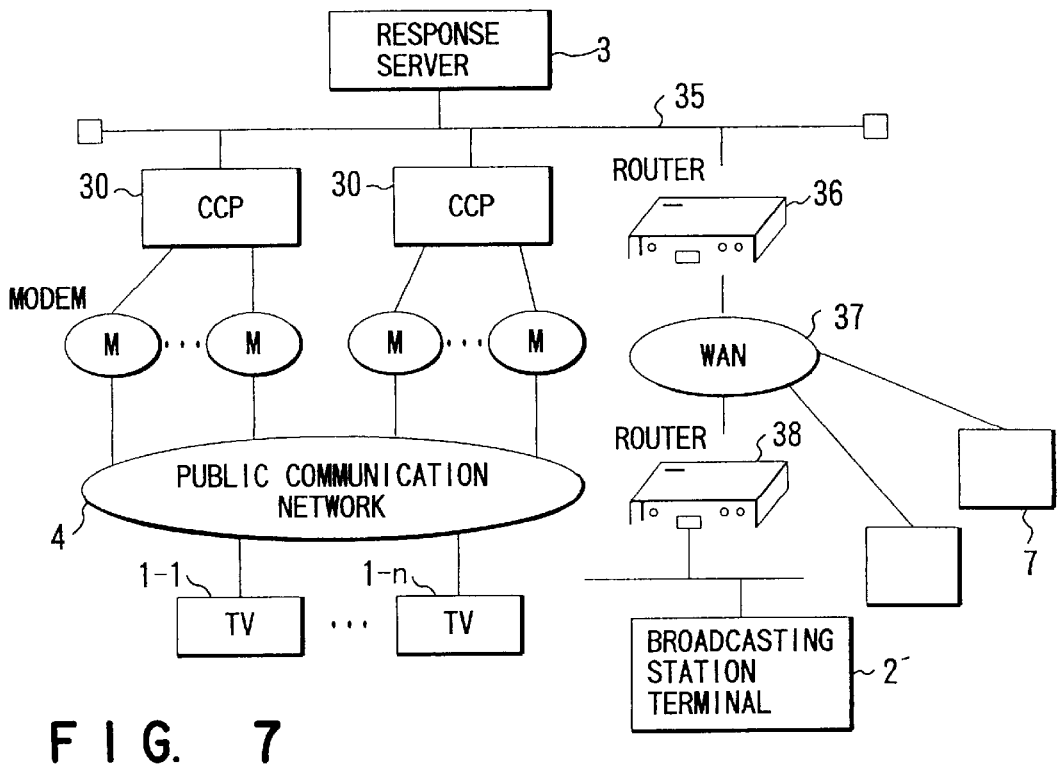
FIG. 7 is a view showing the configuration of a network of the television system according to the first embodiment.

FIG. 7 shows a system configuration for interconnecting the interactive televisions 1-1 to 1-n, the broadcasting station 2, the response server 3, and the IP/SP company servers 7. As described above, the interactive televisions 1-1 to 1-n are connected to the communication control units 30 via the public communication network 4 and modems. The communication control units 30 are arranged on a LAN 35 to which the response server 3 is connected, thereby connecting the interactive televisions and the response server. The communication control units 30 are connected from the LAN 35 to a WAN 37 via a router 36 and connected from the WAN 37 to a broadcasting station terminal 2' via a router 38. The communication control units 30 are also connected from the WAN 37 to the IP/SP company servers 7.

The operation of the television system with the above configuration will be described in detail below.

Figure 8:
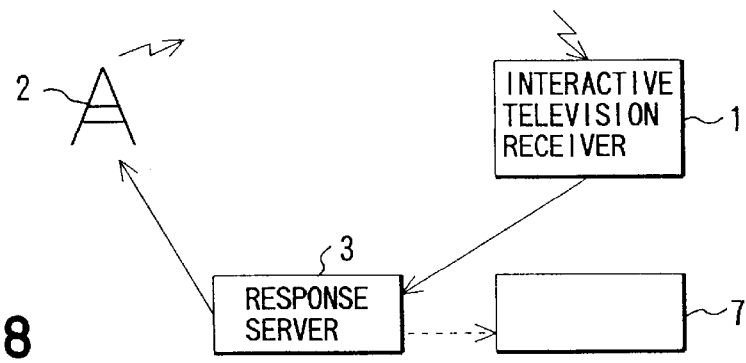
FIG. 8 is a view showing the flow of response data in the first embodiment.
Figure 9:
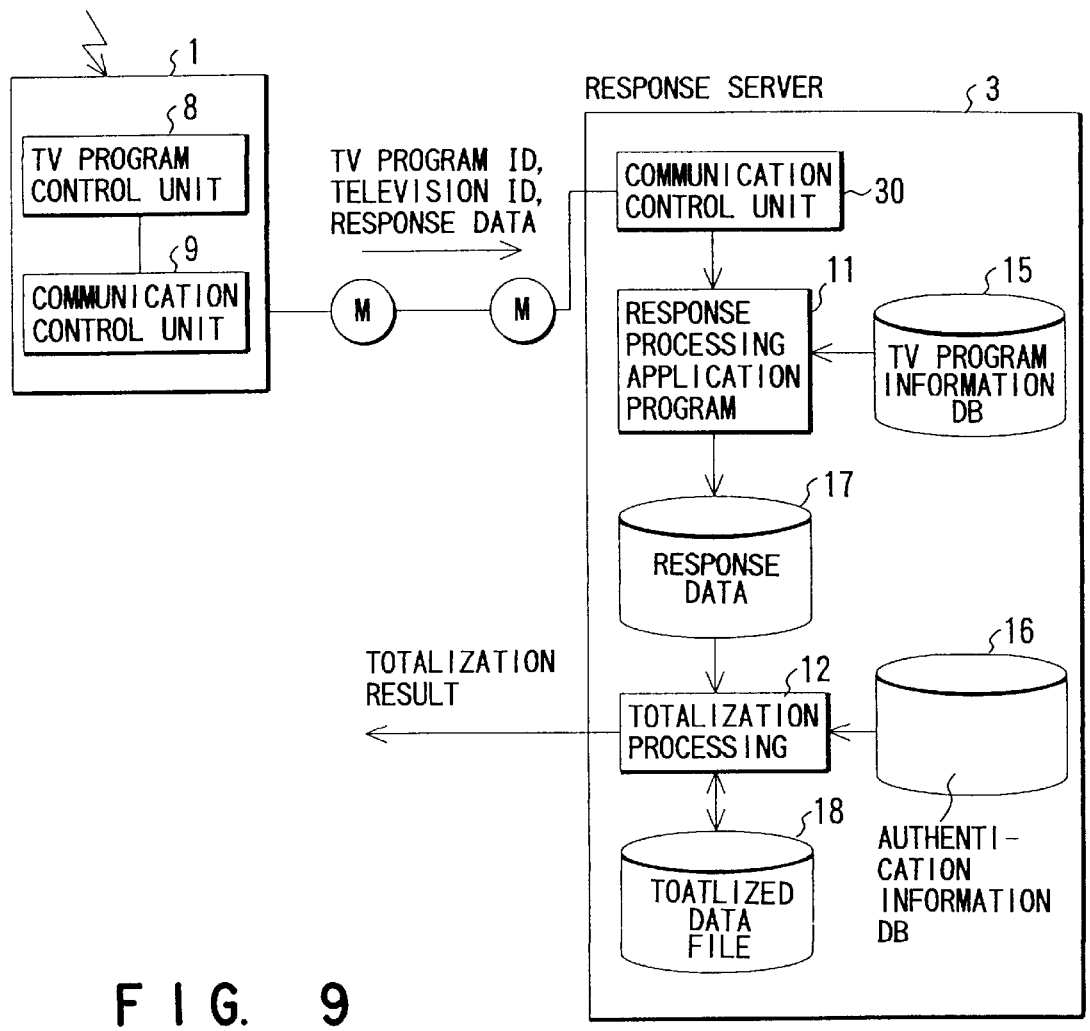
FIG. 9 is a view showing a detailed flow of the response data in the first embodiment.

FIGS. 8 and 9 illustrate the flows of data when a service is provided on the television system by which responses (answers) from viewers to questions are totalized by the response server 3 and the broadcasting station 2 is informed of the result of totalization in an interactive television program pertaining to a quiz show.

The broadcasting station 2 transmits an interactive television program which allows viewers to choose alternative questions and is multiplexed on broadcast radio waves of the quiz show. The television program ID of this interactive television program is added to the program composition information (consisting of screen images and programs) of the interactive television program.

When this quiz show is selected, the signal processing circuit 25 and the audio circuit 27 of each of the interactive televisions 1-1 to 1-n output pictures and sounds of the quiz show. Assume that a channel tuning signal for the interactive television program by which a viewer responds to alternative questions is input from the remote control switch 24. The tuner 22 receives the channel tuning signal of the interactive television program from the channel tuning and response identification circuit 23, separates the interactive television program from the broadcast radio waves, and transfers the program to the television program control unit 8. Thereafter, the program composition information of the interactive television program is kept provided to the program control unit 8 until another channel tuning signal is input or the interactive television program is concluded.

The program control unit 8 receives the data of the interactive television program from the tuner 22 and displays an image showing a question asked in the quiz show. For example, the question screen consists of a plurality of choices, and a message for prompting a viewer to pick up one choice is displayed on the screen.

When the viewer inputs the choice number from the remote control switch 24, the channel tuning and response identification circuit 23 inputs the response (choice number) received from the remote control switch 24 to the program control unit 8.

Upon receiving the response, i.e., the choice number, from the channel tuning and response identification circuit 23, the program control unit 8 adds the television program ID of the presently selected interactive television program and the television ID of the interactive television to the response (choice number: answer) and transfers the response data to the communication control unit 9.

The communication control unit 9 sends a line connection request from this interactive television to the communication control unit 30 of the server 3 via the public communication network 4. After the communication control units 9 and 30 are connected, the response data added with the television program ID and the television ID is transmitted from the interactive television to the response server 3.

In the response server 3, the I/O control unit 34 receives the response data transmitted from the interactive television and analyzes the header of the response data. If the data is identified as response data, the I/O control unit 34 transfers the data to the response processing application program 11. After transferring the response data to the response processing application program 11, the communication control unit 30 of the server 3 disconnects the interactive television and waits for reception of response data from another interactive television.

Figure 6:
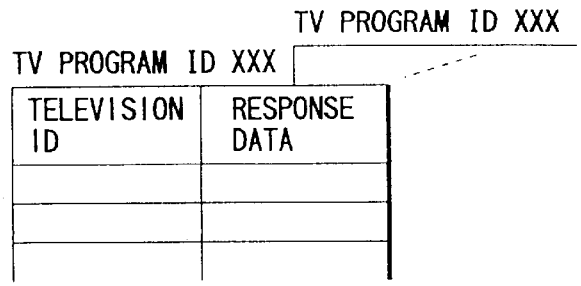
FIG. 6 is a view showing the constitution of a response data list.

The I/O control unit 34 discretely supplies to the response processing application program 11 response data to various television programs from the interactive televisions 1-1 to 1-n. As shown in FIG. 6, the response processing application program 11 arranges the response data to various television programs in accordance with the television program ID and stores the data in the the data file 17. A response data list is formed by arranging and storing the response data in the file form in accordance with the television program ID.

More specifically, a procedure which gives an instruction to "arrange response data in a file form in accordance with the television program ID" is set in the television program information database 15. The response processing application program 11 reads out the procedure from the television program information database 15 by using the television program ID added to the response data as a key. The response processing application program 11 retrieves a file having the corresponding television program ID from the response data file 17, extracts the television ID and the response data (answer) from the response data, and sets the extracted data in the bottom line of the file. By executing this processing for all answers, a list of the response data to the interactive television program pertaining to the quiz show, i.e., an answer list, is formed.

An instruction to "add personal information of an answerer" can be included in the procedure of the interactive television program registered in the television program information database 15. If this is the case, the response processing application program 11 or the totalization processing application program 12 sends the instruction to the authentication processing application program 13. On the basis of the television ID registered in the response data list, the authentication processing application program 13 searches the authentication processing database 16, reads out personal information of an answerer, and transfers the readout personal information to the response processing application program 11 or the totalization processing application program 12.

On the basis of the television program ID, the totalization processing application program 12 reads out the method of totalization corresponding to the program from the television program information database 15. In this embodiment, a method of totalizing the answers to the questions asked in the quiz show is acquired as the procedure. Therefore, the totalization processing application program 12 reads out and totalizes the response data (answers), by using the television program ID as a key, from the response data file 17 formed by the response processing application program 11.

If the totalization processing involving the personal information of answerers is designated in the procedure, the totalization processing application program 12 totalizes the response data by combining the response data list and the personal authentication information. The result of totalization is output in a form corresponding to the transmission type registered in the television program information database 15. When the broadcasting station 2 wants to use the totalization result of answers in the television program, "real time transmission" is designated as the transmission type. The communication line between the response server 3 and the broadcasting station terminal 2' is connected, and the totalization result is transmitted to the broadcasting station terminal 2' via the WAN 37.

In the above explanation, answers from viewers are totalized in a quiz show. However, the contents of services which can be provided to viewers in interactive television programs can be freely set by the combination of the contents of a program to be multiplexed on broadcast radio waves from the broadcasting station 2 and the procedure of the program previously stored in the program information database 15.

As an example, it is possible to provide a service by which viewers can request catalogues of articles advertised in commercial breaks between television programs by using an interactive television program. That is, an interactive television program for displaying a screen for requesting an article catalogue is multiplexed on broadcast radio waves in a commercial break by setting the television program ID.

A viewer of the interactive television 1 inputs a channel tuning signal for selecting the interactive television program for catalogue request from the remote control switch 24. Consequently, the program control unit 8 receives the catalogue request interactive television program from the tuner 22 and displays a catalogue request screen. The viewer inputs response data to the catalogue request screen from the remote control switch 24. The program control unit 8 adds the television program ID and the television ID to the input response data and transmits the data to the response server 3.

In the program information database 15 arranged in the response server 3, procedures for response data relating to these catalogue request interactive television programs are previously registered on the basis of the television program IDs. The interactive televisions 1-1 to 1-n send response data relating to the catalogue request interactive television programs to the server 13. The response processing application program 11 arranges the response data in units of programs.

The totalization processing application program 12 executes totalization processing necessary for the catalogue request on the basis of the procedure registered in the program information database 15. More specifically, the totalization processing application program 12 designates the television IDs and instructs the authentication processing application program 13 to extract the personal information, e.g., the names and the addresses, of individuals who have requested catalogues from the authentication information database 16. The totalization processing application program 12 then forms a catalogue request list showing the correspondence between the types of catalogues and the addresses from the personal information extracted from the authentication information database 16 and the television program IDs.

Since it is unnecessary to transmit the catalogue request list to the IP/SP company in real time, the totalization processing application program 12 stores the catalogue request list in a totalized data storage unit 18. The catalogue request list is transmitted later by batch processing from the server 3 to the server 7 of the contracting IP/SP company. Note that when the catalogue request list is to be transmitted by batch processing, "batch processing" must be specified in the item of transmission type in the television program information database 15. Also, a plurality of catalogue request lists can be simultaneously transmitted when the broadcasting station 2 or the IP/SP company server 7 demands the response server 3 of the transmission. For this purpose, "on demand" is specified in the item of transmission type in the television program information database 15.

The totalization result obtained by the totalization processing application program 12 of the response server 3 is not only transmitted to others but also printed out in the response server 3 or displayed on a CRT depending on the purposes.

Note that the work of forming a list, such as a catalogue request list, in which personal information needs to be processed, can be transferred to the authentication processing application program 13. In the above illustrated example, the totalization processing application program 12 gives the television ID information to the authentication processing application program 13 and makes the function 13 to form a catalogue request list.

In this embodiment of the present invention as described above, the interactive televisions 1 receive broadcast radio waves on which programs are multiplexed and selectively display the programs. The interactive televisions 1 accept responses from viewers and transmit these input choices as response data, together with television program IDs and television IDs, to the response server 3. Response processing and totalization processing application program are performed for the response data by referring to television program information predetermined in accordance with the contents of the individual television programs in the response server 3. Accordingly, it is possible to display arbitrary programs pertaining to television programs or broadcast commercials on the interactive televisions and to collect input choices from viewers as response data. Consequently, information can be provided by properly processing the collected response data in accordance with the contents of the television programs.

In this embodiment, personal information is previously registered in a one-to-one correspondence with the television IDs of the interactive televisions 1-1 to 1-n in the authentication information database 16 of the response server 3. Therefore, processed data can be formed by adding the personal information to the response data collected from the interactive televisions 1-1 to 1-n. This allows easy formation of various lists requiring the personal information.

In the above embodiment, it is also possible to display programs having no relation to television programs or broadcast commercials and collect response data from viewers of the interactive televisions.

(Second Embodiment)

The second embodiment is a television system using interactive televisions capable of selecting interactive television programs. The basic system configuration and software configuration of the second embodiment are identical with those of the first embodiment.

In this television system, only a program start menu screen (selection screen) displayed when an interactive television program is started is multiplexed on broadcast radio waves and transmitted from a broadcasting station 2. After the interactive television program is started, a response server (the response server itself or an application program arranged in another server) provides program composition information of the interactive television program.

Each of interactive televisions 1-1 to 1-n adds the television program ID and the television ID to the response data from the viewer. An I/O control unit 34 of a response server 3 adds a header to the response data and transmits the data. The header functions as an identifier by which the response data is transferred to an online service manager 19.

The online service manager 19 has a function of searching a television program information database 15 on the basis of the television program ID added to the response data and specifying an application program to be connected to a communication control unit 30. In the television program information database 15, connection destination application information is registered in television program information of each corresponding television program ID.

Figure 10:
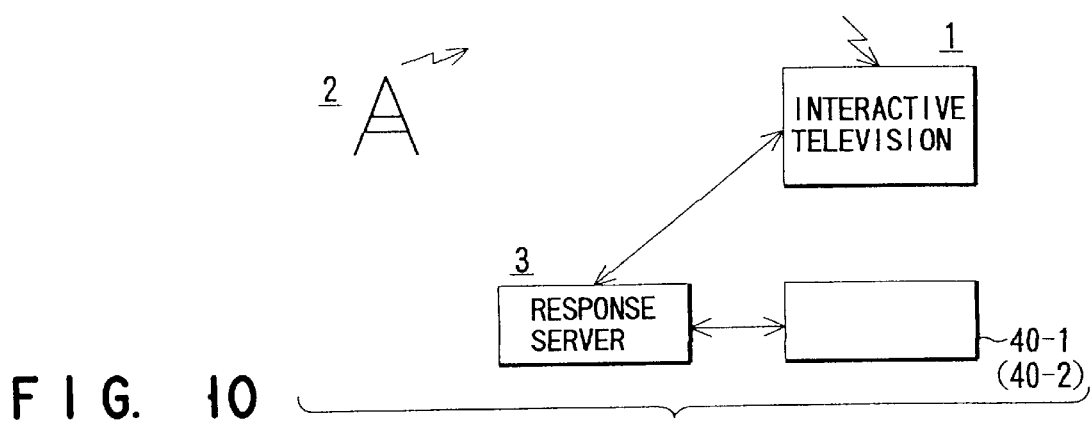
FIG. 10 is a view showing the flow of response data when a server supplies a television program in the second embodiment.
Figure 11:
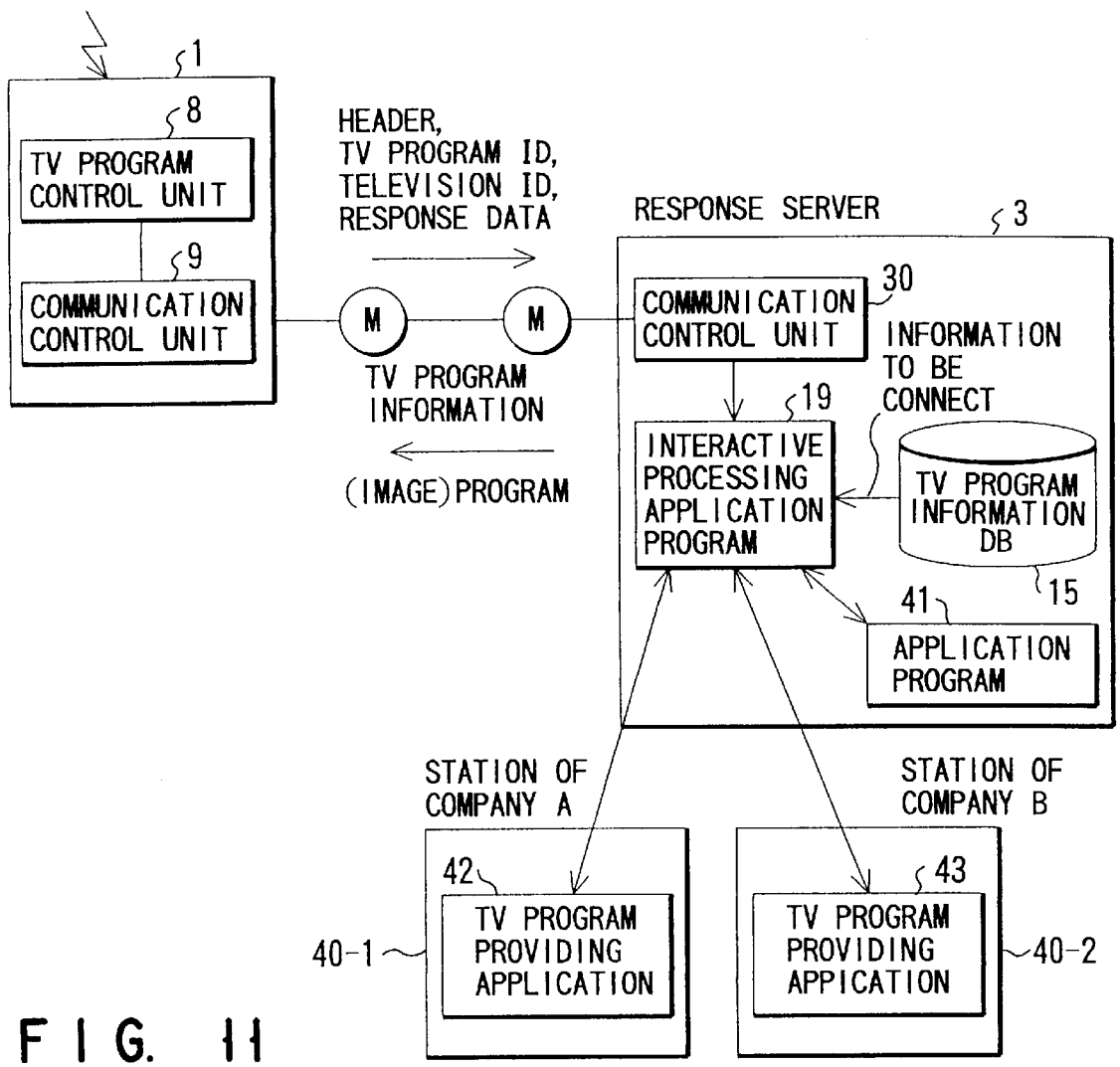
FIG. 11 is a view showing a detailed flow of the response data when the server supplies a television program in the second embodiment.

The form of a service provided on this television system will be described below with reference to FIGS. 10 and 11.

While commercials are being broadcast, a program start menu screen of an interactive television program such as online shopping or catalogue request is multiplexed on broadcast radio waves and transmitted from the broadcasting station 2. Upon receiving an interactive television program tuning signal from a remote control switch 24, each of the interactive televisions 1-1 to 1-n displays the program start menu screen through the channel of the selected interactive television program. Thereafter, the online service between the interactive television and the response server 3 starts independently of the broadcast program from the broadcasting station 2.

When a program start request is input to the program start menu on the interactive television, response data indicating the program start request, which is added with the television program ID, the television ID, and an interactive header, is transmitted from a communication control unit 9 of the interactive television to the response server 3.

The I/O control unit 34 of the response server 3 analyzes the header of the response data. If the header of the response data is an interactive header, the I/O control unit 34 transfers the response data to the online service manager 19 and maintains the connection of the communication line.

The online service manager 19 reads out connection application information from the television program information database 15 by using the television program ID added to the response data as a key, and activates the application program specified in the readout connection application information.

If an application program 41 arranged in the response server 3 is specified in the connection application information, this application program 41 transmits program composition information such as images and scripts corresponding to the contents of the television program to the interactive television as request source via a public communication network 4.

In the interactive television which has received this program composition information such as images and scripts, a program control unit 8 executes a program unit of the program composition information, thereby outputting images and, in some instances sounds, of the interactive television program. When the viewer inputs a response signal to this interactive television program by using the remote control switch 24, response data formed by adding the television program ID and the television ID to this response is transmitted to the response server 3.

In the response server 3, the response data is transferred to the application program 41. Upon receiving the response data, the application program 41 transmits images or scripts for starting the next processing to the interactive television. The shopping procedure or the catalogue request procedure is completed by similarly repeating the exchange of the response data and the program composition information between the server 3 and the interactive television. If the contents of the procedure are simple, the procedure is completed only by transmitting the response data once.

If the application program specified in the connection application information read out from the television program information database 15 by the online service manager 19 by using the television program ID as a key is not arranged in the response server 3, the line is connected to another server 40-1 (40-2) in which this specified application program is arranged. It is assumed that address information for connecting the line to the server 40-1 (40-2) is set in the television program information database 15.

For example, if an application program 42 arranged in the server 40-1 is specified in the connection application information, the response server 3 is connected to the server 40-1 via a high-speed digital network to activate the application program 42. The composition information such as images of the interactive television program is transmitted from the application program 42 to the interactive television 1 via the response server 3. By arranging the application program 42 and an application program 43 in the servers 40-1 and 40-2 managed by providers of articles, the procedures of online shopping and catalogue request can be directly transferred to the article providers.

In this embodiment as described above, the program start menu of an interactive television program is multiplexed on broadcast radio waves and broadcast from the broadcasting station 2. Each interactive television adds the television program ID, the television ID, and the interactive header to response data and transmits the response data to the response server 3. An application program arranged in the response server 3 or in another server transmits images and programs to the interactive television via the response server 3. Therefore, by initially transmitting only the program start menu from the broadcasting station 2 to the interactive televisions, the application program of the response server 3 can provide the subsequent procedure.

Accordingly, online shopping and catalogue requests using the interactive televisions can be performed without increasing the load on broadcast radio waves. Also, the program start menu of an article pertaining to a commercial or a television program being broadcast can be selected by the interactive television.

In the above second embodiment, the program start menu is transmitted from the broadcasting station 2 to the interactive televisions. However, the program start menu of an interactive television program having no relation to a commercial or a television program being broadcast can be previously stored in a ROM of the interactive television and displayed at any time.

(Third Embodiment)

Figure 12:
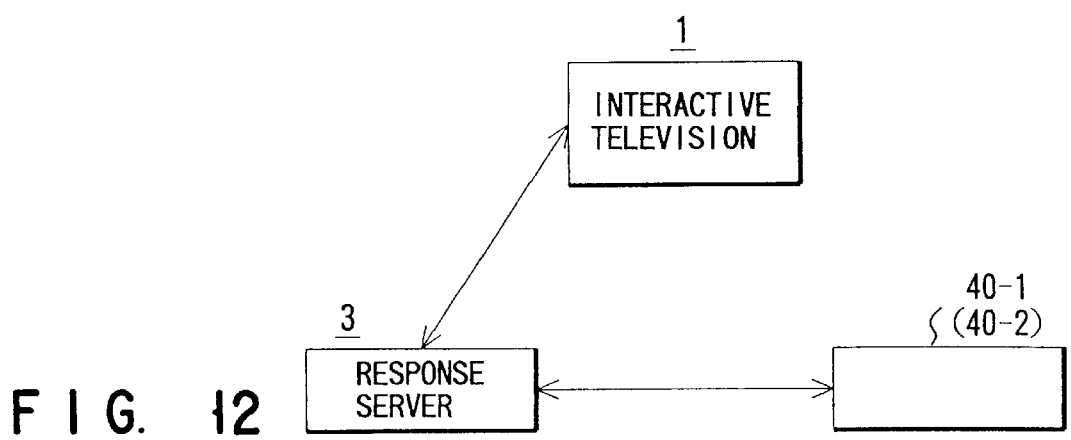
FIG. 12 is a view showing the flow of response data when an IP/SP server supplies a television program in the third embodiment.

FIGS. 12 and 13 illustrate a modification of the second embodiment. In this television system, a menu of interactive services provided by a server is previously stored in a storage medium of an interactive television, and a viewer can select a service on the interactive television. The services provided to the interactive television by the server can be processed as one form of interactive television programs in the same manner as in the second embodiment.

Upon receiving a request to display the provided service menu from a viewer, an interactive television 1 displays the menu previously stored in a storage medium such as a ROM. When the viewer selects one provided service from the menu, data as a start request operation is added with the service ID, the television ID, and a header for requesting interactive communication and transmitted from a communication control unit 9 of the interactive television to a response server 3. Service IDs are registered instead of television program IDs in a program information database. The subsequent processing is identical with that in the second embodiment.

In this embodiment as described above, online shopping and catalogue requests can be performed by the interactive television independently of broadcasting from a broadcasting station.

(Fourth Embodiment)

The fourth embodiment is an interactive television system in which a VTR is connected to an interactive television and a recorded video tape such as an article explanation video tape, into which a program equivalent to the interactive television program described above is inserted, is reproduced by the VTR to thereby provide program information to the interactive television. This allows a viewer to order articles or obtain catalogues or information.

FIG. 14 shows the concept of the interactive television system according to the fourth embodiment. FIG. 15 shows the details of this interactive television system.

A VTR 50 is installed in a place where it can be connected online to an interactive television 60. A video tape (to be described later) sold or distributed by an article distributor is reproduced by using this VTR 50. The VTR 50 incorporates a video head 51 for reproducing a video signal, an image reproducing circuit 52 for reproducing an image signal from the signal read out by the video head 51, and a script reproducing circuit 53 for reproducing a script and article information embedded in the script.

The VTR 50 transmits the script (and image control information) in which the article information is embedded during a vertical blanking interval (VBL) of image information. A whole bit stream, excluding partial control information, transmitted in a teletext transmission period during the VBL to display additional information is simply called a script.

The interactive television 60 includes a teletext video receiver 61 for receiving the video signal transmitted from the VTR 50, and a display (CRT) 62 for selectively displaying the video image obtained by the teletext video receiver 61 and regular teletext or interactive teletext obtained by a multimedia teletext receiving circuit 63. The multimedia teletext receiving circuit 63 discriminates text data (VBL data) from the video signal transferred from the teletext video receiver 61, separates the data into data of regular image information and data of a plurality of different additional information relating to the image information, and generates display data of the regular image information and display data of the plurality of different additional information relating to the image information. This receiving circuit 63 interprets and executes the received script, supplies display information in the script to an image processing circuit of the teletext video receiver 61, and supplies to a modem 64 information to be transmitted to a response server 3. The modem 64 connects the multimedia teletext receiving circuit 63 to a public telephone line. The modem 64 transmits data processed by the multimedia teletext receiving circuit 63 to a connection destination (e.g., the response server 3) given by an interactive teletext decoder of the receiving circuit 63 (i.e., embedded in the received script) by automatically dialing the destination. That is, by performing a specific key operation on a remote control unit 65, a viewer can automatically dial, via the modem 64, a connection destination (e.g., the response server 3) given by the interactive teletext decoder by using information registered in an apparatus management personal identification information registration setting unit [PS] of a ROM (to be described later) as a transmission source.

The response server 3 basically has functions similarly to those in any of the embodiments described previously. That is, the response server 3 includes CCP facilities 71 for exchanging data with the multimedia teletext receiving circuits 63 of the interactive televisions 60 in a large number of general homes. A plurality of response server facilities 72 following a center server facility (to be described later) distributively process information to be transmitted to and received from the interactive televisions 60. These response server facilities 72 can access a local database (L-DB) 73 which stores personal information in a predetermined area for managing subscribers. A center server facility 74 totalizes the results of the distributed processing by the response server facilities 72. The center server facility 74 has a master database (M-DB) 75 which stores personal information in all areas for managing subscribers. An IP/SP facility 77 previously receives, from a network service 7, processing instructions to response data from the interactive televisions 60, and returns, to the network service 7, the response results from the interactive televisions 60 in a form desired by the network service 7. An operational management facility 76 is an application which operates and manages the response server system consisting of the facilities described above.

The internal configuration of the multimedia teletext receiving circuit 63 will be described below.

FIG. 16 shows internal functional blocks of the multimedia teletext receiving circuit 63. A CPU 81 controls internal operations of the receiving circuit 63. The receiving circuit 63 is a script processor for providing a plurality of different additional information pertaining to image information. Accordingly, the CPU 81 executes processing of a script processing module [SCR] of a ROM (to be described later) and thereby realizes an interactive teletext decoder.

An input video signal from the video receiver 61 is stored in a RAM 83 via a waveform equalizing data separating circuit 82. The waveform equalizing data separating circuit 82 discriminates teletext data and interactive teletext data (i.e., a script for displaying additional information) from the video signal (Video) received by the teletext video receiver 61 and, under the control of the CPU 81, stores the received teletext data and the received script in the RAM 83. The CPU 81 buffers (stores) the received script discriminated from the video signal (Video) in the RAM 83, interprets and executes the script, and generates display data (RGB signal).

The RAM 83 is used as a work memory of the CPU 81 and includes a data communication control program [DCOM], a drawing program [PICM], a user interface program [USIF], a script buffer [SCB], and a teletext buffer.

Basic control programs executed by the CPU 81 and fixed information are stored in a ROM 84. The ROM 84 stores a script processing module [SCR] for executing script processing and a teletext processing module [CBP] for executing teletext processing. Also, the ROM 84 includes an apparatus management personal identification information registration setting unit [PS] for registering a specific ID of an apparatus issued to each receiver and a personal ID, a kanji-character management unit [C·HA] which stores and manages kanji and other characters, and an icon management unit [ICON].

Display data is stored in a display memory (VRAM) 85. For example, the VRAM 85 stores display data processed by the drawing program [PICM].

A signal from the television receiving circuit of the interactive television 60 is supplied to a channel tuning microprocessor (channel tuning MP) 86. The channel tuning MP 86 receives a signal from the remote control unit 65 and separates the signal into a television operation command and an additional information display selection control command. The channel tuning MP 86 sends the television operation command to the television receiving circuit and stores the additional information display selection control command in a remote control receiving buffer register of the RAM 83. The channel tuning MP 86 transfers the additional information display selection control command to the CPU 81 in a bit parallel manner.

Figure 17:
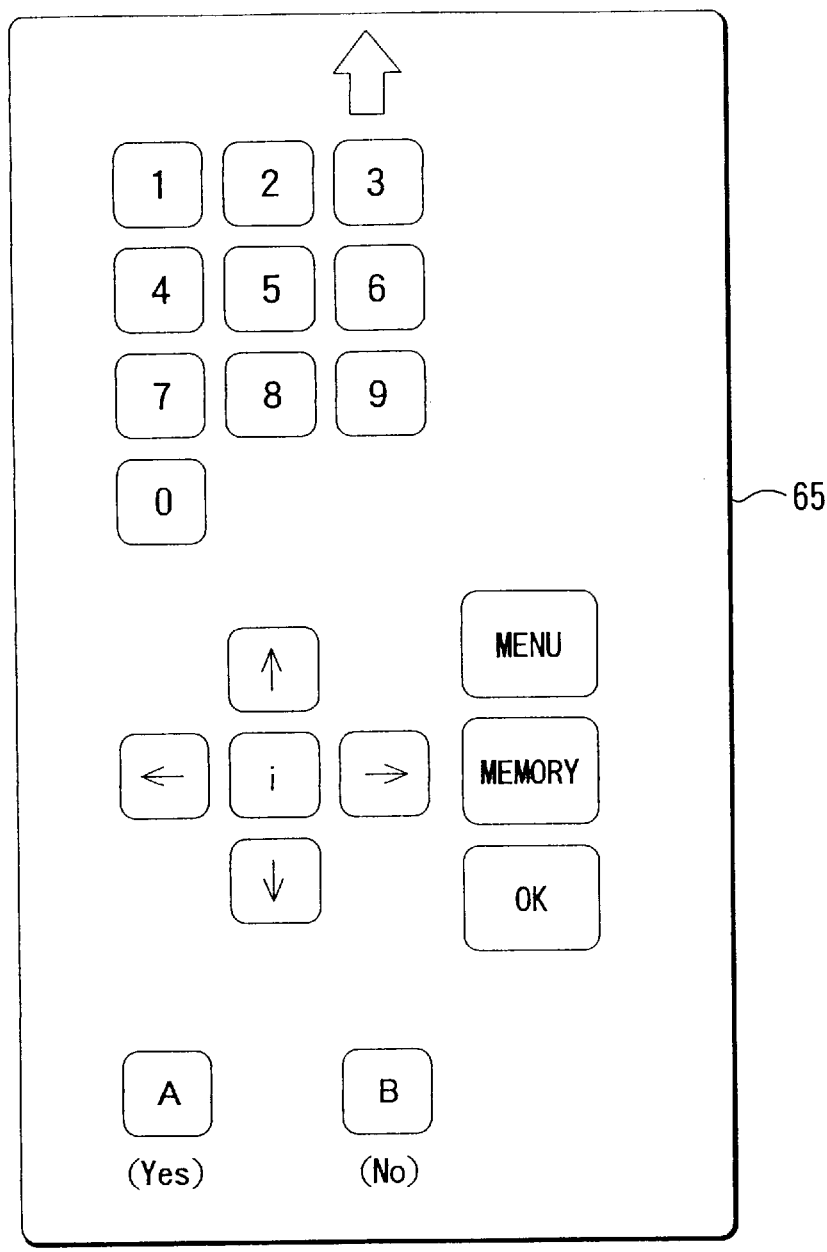
FIG. 17 is a view showing the arrangement of switches of a remote control unit.

FIG. 17 shows the configuration of the remote control unit 65 for remotely operating the interactive television 60. This remote control unit 65 includes a mode switching key (i key) for switching valid and invalid states of an interactive mode, and direction keys (one in each of up, down, left, and right) and an OK (determination) key for selecting an arbitrary one of a plurality of choices shown in, e.g., an additional information selection screen. The mode switching key (i key) is a toggle key by which the valid and invalid states of the interactive mode are alternately switched. When the interactive mode is set to be valid, a mark "i" is displayed in the upper left corner of the display (CRT). The channel tuning MP 86 is reflected only on additional information to which some keys (e.g., numerical keys) are displayed when the interactive mode is valid (i.e., when the mark "i" is displayed).

A provider who wants to sell articles by using the interactive television system as described above makes a video tape by taking images (including sounds) for introducing the articles. Methods of ordering the articles and obtaining catalogues of the articles are embedded in the form of a script in the video signal.

FIG. 18 shows a system for recording a picture of an article and superposing text data (VBL data) relating to the article on the image. A recorder 91 records an image of an article, and a text data generator 92 generates text data including a script in which information pertaining to the article is embedded. The text data including the script formed by the text data generator 92 is transmitted to a multiplexer 94 via a transmission control unit 93. The transmission control unit 93 controls transmission of the text (VBL data) including the script. In synchronism with the video signal from the recorder 91, the multiplexer 94 multiplexes the text data including the script in a predetermined region of the video signal. In this manner, a video tape in which the script is embedded is formed. Information such as transfer destination information is embedded in the script.

FIG. 19 shows an example of the procedure in the interactive television system. The procedure will be described below with reference to FIG. 19 by taking video shopping as an example.

In step (1), the VTR 50 is connected to the interactive television 60, and the video tape which is formed by the recording system described above and in which the script is embedded is reproduced by the VTR 50. The VTR 50 transmits the script (and screen control information) in which article information is embedded during the VBL of image information.

FIGS. 20A and 20B illustrate even-numbered fields and odd-numbered fields, respectively, of the video signal reproduced by the VTR 50 and transmission timings of the script (and the screen control information). The script (and the screen control information) is transmitted by using a VBL horizontal scan period indicated by c in FIGS. 20A and 20B in addition to a VBL horizontal scan period (current teletext signal) for transmitting regular teletext data.

By the processing in step (1), a teletext (coded transmission teletext) video signal formed by embedding the script in which transfer destination information (e.g., a phone number) is embedded is transmitted in the transmission form shown in FIGS. 20A and 20B during the VBL. More specifically, the script (including a script main body (program unit) describing the procedure, a header, a form, and a resource) for providing a plurality of different pieces of additional information linked with the image information and the phone number embedded in the script are transmitted during the vertical blanking interval (VBL) contained in the video signal. As an example, shopping information provided by the VTR is transmitted together with a client phone number.

In step (2), the interactive television 60 receives the video signal into which the shopping information reproduced by the VTR is inserted, and stores (buffers) the reception script contained in the signal. That is, the multimedia teletext receiving circuit 63 of the interactive television 60 discriminates the VBL data from the transmitted video signal and separates the data into data of regular image information and data of a plurality of different pieces of additional information linked with the image data. The receiving circuit 63 generates display data of the regular image information and display data of the plurality of different pieces of additional information linked with the image information and stores (buffers) these display data in the RAM 83.

Figure 21A:
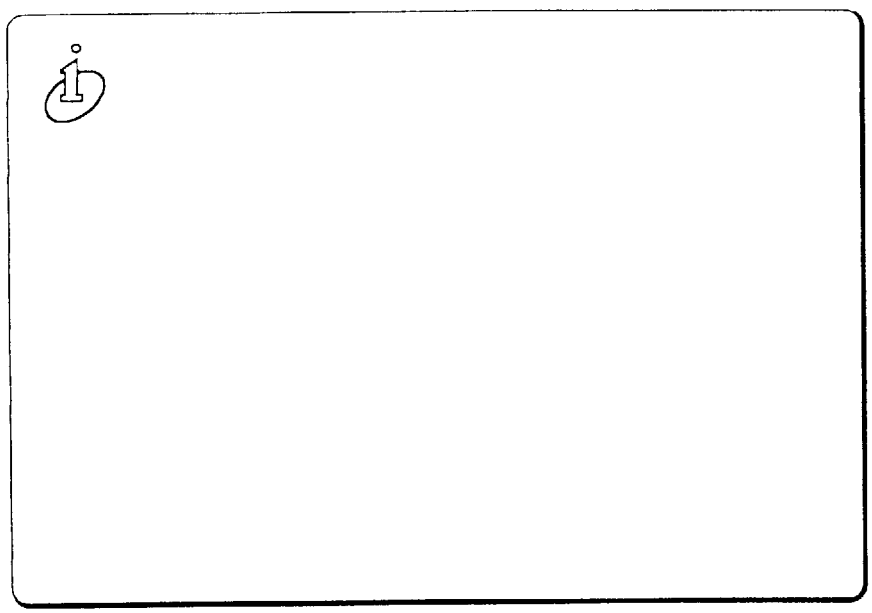
FIG. 21A is a view showing an initial screen image of an interactive television program.
Figure 21B:
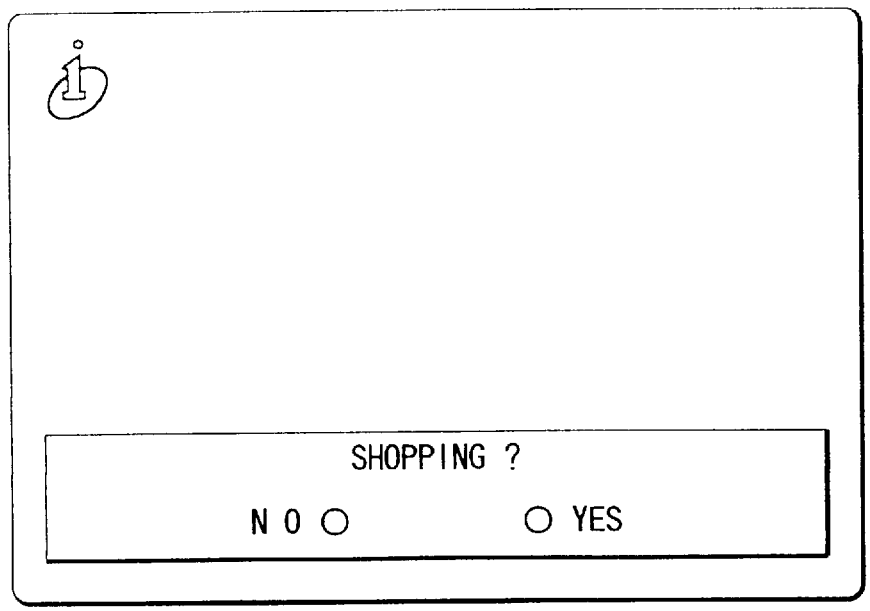
FIG. 21B is a view showing an initial screen image of television shopping.

In step (3), the viewer makes the interactive mode valid by operating the mode switching key (i key) of the remote control unit 65. Consequently, a mark "i" as shown in FIG. 21A is displayed in the upper left corner of the display (CRT) 62 to indicate that the interactive mode is set. Additionally, a screen shown in FIG. 21B is displayed to check whether the viewer wants shopping.

Figure 22A:
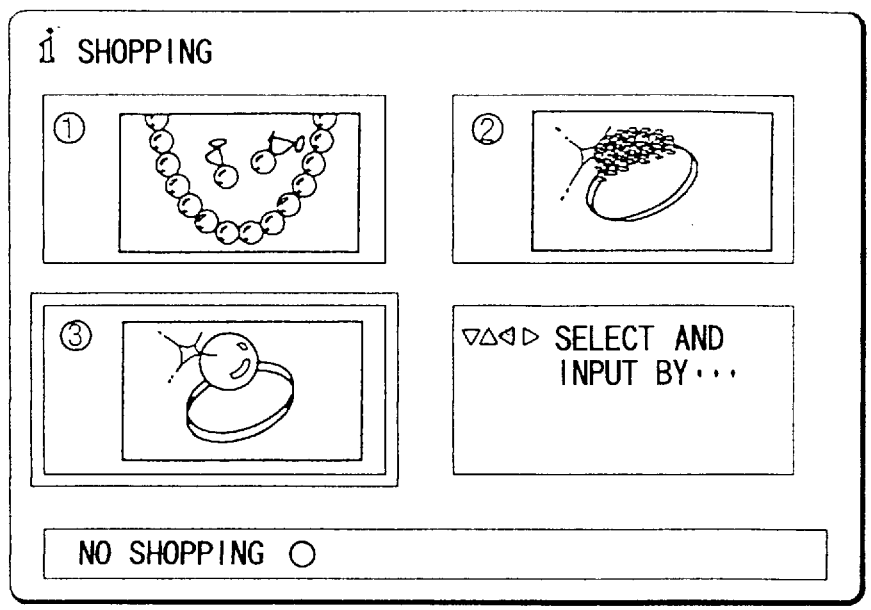
FIG. 22A is a view showing an article display screen in the television shopping program.

When the mode switching key (i key) is operated, the CPU 81 executes the processing of the script processing module [SCR] in the ROM 84, and this allows the interactive teletext decoder to execute the script processing. As a consequence, an additional information selection screen (shopping selection screen) as shown in FIG. 22A is displayed (step (4)).

While this additional information selection screen (shopping selection screen) is displayed, the viewer operates the direction key (in this case the left or the right key) (step (5)) to emphasize (e.g., flicker) the designated choice, thereby clearly displaying the designated choice (step (6)). When the "OK" (determination) key is operated while the choice indicating shopping is emphasized (flicker), a shopping information introduction and selection screen as shown in FIG. 22B is displayed (steps (5) and (6)).

Figure 22B:
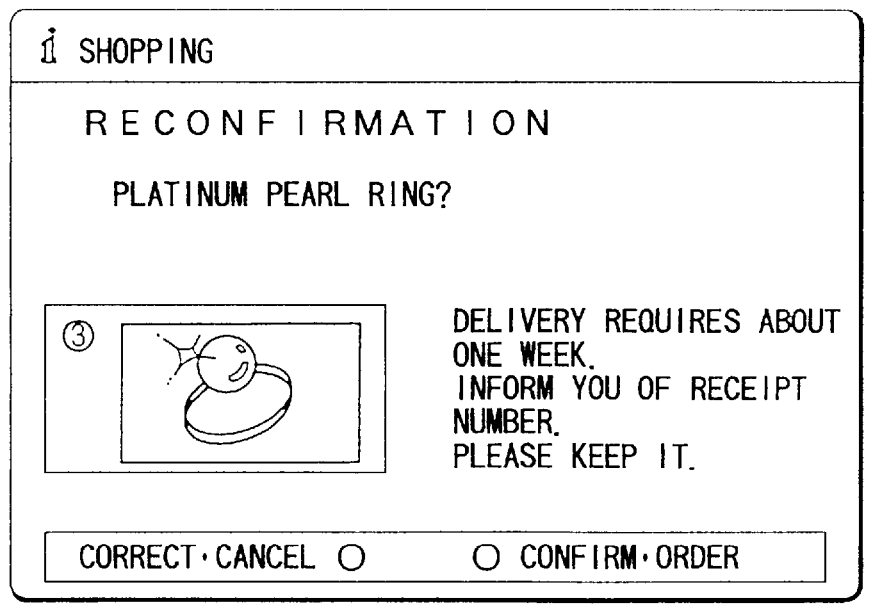
FIG. 22B is a view showing a purchase confirmation screen in the television shopping program.

When the viewer selects a certain article on the shopping information introduction and selection screen shown in FIG. 22B, a screen shown in FIG. 23A for confirming details of the transaction or details of the article is displayed. If "correct" is selected on this screen, the screen shown in FIG. 22B is returned. If "confirm (order)" is selected on the screen (FIG. 23A) for checking details of the transaction or details of the article (step (7)), the transaction information is automatically transmitted to the response server 3 on the basis of the client phone number received via the modem 64 and the telephone line. At the same time, a screen as shown in FIG. 23B which indicates that the transaction is being made is displayed.

Upon receiving the transaction information from the interactive television 60, the response server 3 searches the local database 73 in accordance with the apparatus ID or the personal ID contained in the information and executes confirmation processing and registration processing in accordance with the contents of the transaction. When the transaction is established, this information is returned to the interactive television 60 as a client.

Upon receiving the transaction establishment information from the response server 3 via the modem 64, the interactive television 60 displays the screen as shown in FIG. 23B in accordance with the contents of the information.

In this embodiment as described above, a video signal in which a script is embedded can be supplied to the interactive television 60 by using the VTR 50 widely spread in general homes. Accordingly, interactive services such as online shopping can be provided by the third method, i.e., from neither a broadcasting station nor a server.

In the fourth embodiment, only single shopping information is exemplified. However, for shopping, it is possible to provide a plurality of different transaction services over jewels, foods, cloth, and real estates, and different phone numbers classified in accordance with the industry and the trader can be automatically transmitted. If this is the case, a plurality of phone numbers independently set in accordance with the industry and the trader are embedded in a transmission script. When a transaction is made by the interactive television 60, phone numbers corresponding to the contents of the transaction and classified in accordance with the industry and the trader are sent to the modem 64. This realizes transaction services using a plurality of telephone lines.

Also, by performing a specific key operation on the remote control unit 65, it is possible to automatically dial, via the modem 64, a connection destination registered in the apparatus management personal identification information registration setting unit [PS] of the ROM 84.

(Fifth Embodiment)

Figure 24:
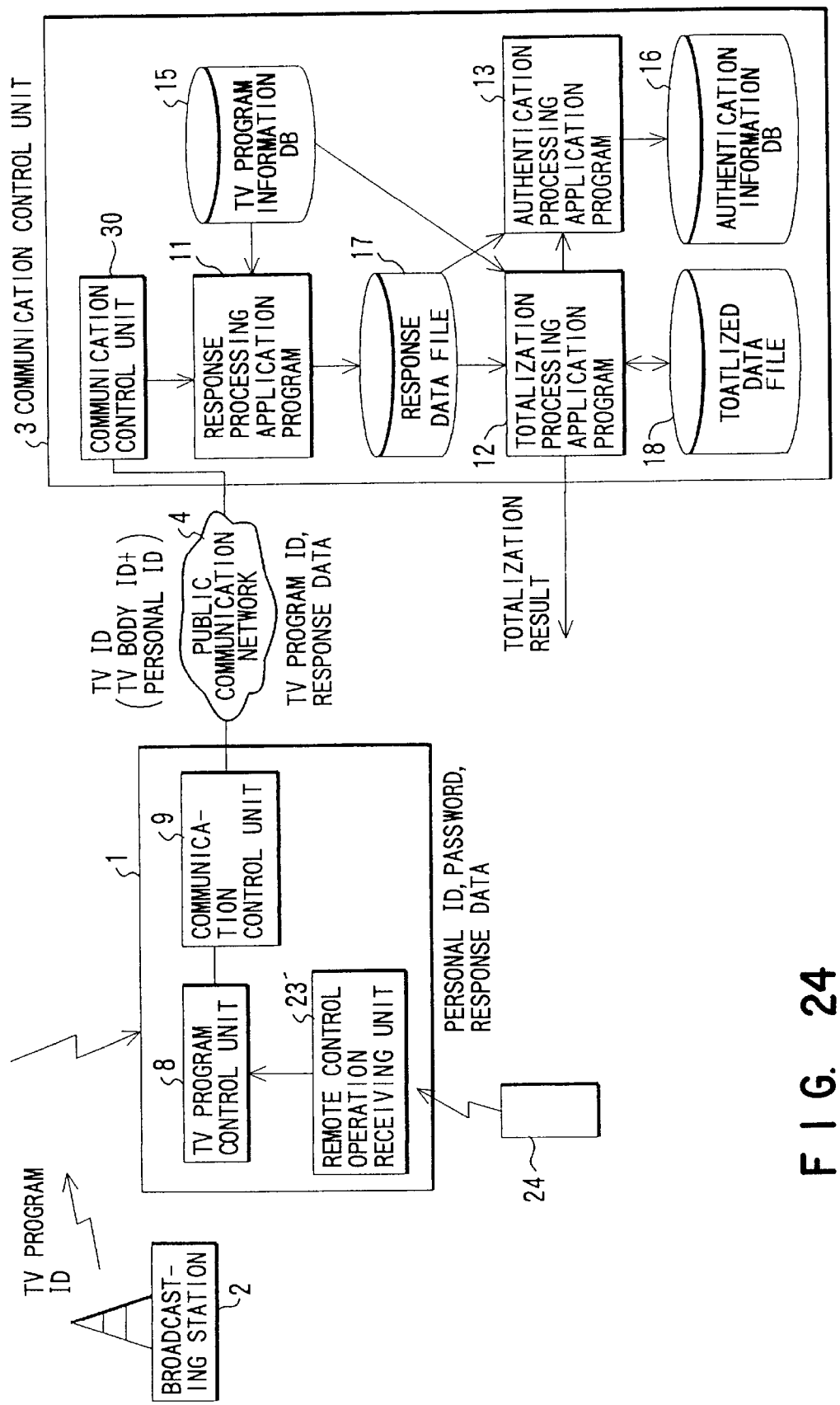
FIG. 24 is a functional block diagram of a television system according to the fifth embodiment.

FIG. 24 shows functional blocks of a television system according to the fifth embodiment.

In this television system, an interactive television 1 for receiving broadcast radio waves transmitted from a broadcasting station 2 and displaying programs can be connected to a response server 3 via a public communication network 4.

The interactive television 1 basically has the same functions as those of the interactive television used in the television system according to the first embodiment. That is, the interactive television 1 has a function of separating sounds and images of a program multiplexed on broadcast radio waves transmitted from the broadcasting station 2, a function of converting the television program into a television signal in accordance with a program selection request (channel tuning operation) and displaying the television signal, and a response function of transmitting response data input by a viewer to a multiplexed program to the response server 3. In this interactive television 1, a remote control operation receiving unit 23' transfers a viewer's response signal received from a remote control switch 24 to a program control unit 8. The remote control operation receiving unit 23' is obtained by separating the function of a response identification circuit from a channel tuning and response identification circuit.

The program control unit 8 executes an interactive television program separated from broadcast radio waves, receives a response from a viewer, adds the television program ID and the television ID to the response, and transfers the response to a communication control unit 9. This television program ID is simultaneously transmitted on broadcast radio waves when the program is transmitted from the broadcasting station 2 to the interactive television 1. The television ID is set for each interactive television 1.

Information fields of the television ID include a television information field and a personal information field. In the television information field, an inherent television ID of the interactive television 1 is set. In the personal information field, a personal ID for specifying a viewer who inputs response data when the interactive television 1 is shared by a plurality of persons (e.g., members of family) is set.

FIG. 25 shows the structure of the remote control switch 24. More specifically, FIG. 25 is a perspective view of DIP switches arranged on the rear surface of the remote control switch 24.

DIP switches 100 consist of four switches 100a to 100d each of which can be set to two states, "up" and "down". A personal ID can be set by combining "up" and "down" of the switches 100a to 100d. Dedicated remote control units are provided to a plurality of persons who use the same interactive television, and the personal ID of each person is set in the corresponding remote control unit. When a single remote control unit is shared by a plurality of persons, the personal ID of a person to whom interactive television programs are provided by the interactive television is set by the DIP switches 100. When transmitting the response data to the interactive television 1, the remote control switch 24 simultaneously transmits the personal ID set by the DIP switches 100.

The program control unit 8 forms the television ID by combining the personal ID received from the remote control switch 24 and the unique television ID of the interactive television 1. FIG. 26 shows the data structure of the television ID formed by the program control unit 8. This television ID is added together with the television program ID to the response data.

The response server 3 includes a television program information database 15 and an authentication information database 16. As in the first embodiment, procedures for response data to individual programs are registered in units of programs in the television program information database 15. In the authentication information database 16, the television IDs of all interactive televisions 1-1 to 1-n previously registered and the personal information such as the names and the addresses of the users are registered.

FIG. 27 shows the data structure of the authentication information database 16. The authentication information of previously registered viewers (users) are registered in this authentication information database 16, and the pieces of authentication information are classified in accordance with the television ID. A plurality of personal IDs can be set for one television ID (interactive television), and various pieces of authentication information are previously set for each personal ID. That is, the pieces of authentication information of an arbitrary number of persons are registered for one interactive television 1. The authentication information consists of the password and the area code as well as the name, the address, the age, and the sex.

The operation of the television system with the above configuration will be described below.

The operation will be described by taking as an example the form of a service by which "responses from viewers to a quiz show are totalized by the response server 3 and the broadcasting station 2 is informed of the result of totalization".

Program data of an interactive television program consisting of screen images and scripts for allowing a viewer to choose answers to alternative questions is broadcast on broadcast radio waves from the broadcasting station 2 to the interactive televisions 1. This program data contains the television program ID registered in the television program information database 15.

When a viewer transmits a signal for requesting an answer selection program from the remote control switch 24 to the interactive television 1, the interactive television 1 separates program data of the answer selection program (interactive program) from the broadcast radio waves of the quiz show and supplies the data to the program control unit 8. The program control unit 8 converts the program data of the answer selection program into a television signal and displays a selection menu for allowing the viewer to choose an answer on the television screen.

When the viewer inputs the answer number by operating buttons on the remote control switch 24, this answer number is transmitted together with the personal ID data set by the DIP switches 100 of the remote control switch 24 to the interactive television 1.

The program control unit 8 of the interactive television 1 receives the answer number (response data) and the personal ID number from the remote control switch 24 and forms a television ID from the personal ID data and the television ID of the interactive television 1. The program control unit 8 adds the television ID including the personal ID and the television program ID described above to the answer number (response data) received from the viewer and transfers the response data to the communication control unit 9. The communication control unit 9 sends a line connection request from the interactive television 1 to a communication control unit 30 of the response server 3 via the public communication network 4. After the line is connected between the communication control units 9 and 30, the response data added with the television program ID and the television ID is sent from the interactive television 1 to the response server 3.

A large number of interactive televisions 1 send response data to the response server 3 via the public communication network 4. In the response server 3, a response processing application program 11 reads out a procedure of the answer selection program from the television program information database 15 by using the television program ID added to the response data as a key, and executes processing in accordance with the contents of the procedure. In this embodiment, the response processing application program 11 forms a response data file 17 indicating the correspondence between the television IDs and the response data in the answer selection program. Since a plurality of different programs are simultaneously provided, the response data file 17 is formed for each program.

By using the television program ID of a program for which the response data file 17 is formed as a key, a totalization processing application program 12 loads the contents of totalization processing performed for the program from a television program information database 14. If processing based on the personal authentication information corresponding to the television ID is specified as the contents of totalization processing, an authentication processing application program 13 is activated. In the case of totalization of answers in a quiz show, it is possible to specify totalization processing of "totalizing answers to quizzes in accordance with the age and the sex".

The authentication processing application program 13 authenticates the television ID of each response data registered in the response data file 17 of the program specified by the totalization processing application program 12. If the authenticated television ID is "XXXX01", the authentication information (age·sex) of "TARO" is extracted from a plurality of persons capable of inputting response data to the interactive television 1. If the television ID of the response data from the same interactive television 1 is "XXXX02", the personal ID indicates "HANAKO". Accordingly, the authentication information (age·sex) of "HANAKO" is extracted. Likewise, authentication information is extracted on the basis of the television ID (television ID+personal ID) for all response data registered in the response data file 17.

The totalization processing application program 12 totalizes the response data by using the authentication information extracted by the authentication processing application program 13, i.e., totalizes all answers on the basis of the age and the sex. This totalization result is output in a form corresponding to a transmission type registered in the television program information database 15. If the broadcasting station 2 uses the result of totalization of answers in the television program, "real time transmission" is specified in the television program information database 15. The communication line between the response server 3 and the broadcasting station 2 is connected, and the totalization result is transmitted to the broadcasting station 2 via a WAN.

In the above explanation, answers from viewers to a quiz show are totalized. However, the contents of programs processable by the response server 3 can be freely changed by the combination of programs multiplexed on broadcast radio waves from the broadcasting station 2 and television program information previously stored in the television program information database 15 in accordance with the programs.

As an example, catalogues of articles being commercially broadcast can be requested by the interactive television. That is, program data consisting of screen images and programs for requesting article catalogues is multiplexed together with the television program ID on broadcast radio waves and broadcast in a commercial break.

If the catalogue request program is requested from the remote control switch 24 to the interactive television 1, the program control unit 8 executes the programs of the catalogue request program and displays information for a catalogue request on the television screen. A viewer watching the displayed catalogue request screen performs a button operation for the catalogue request from the remote control unit 24. The response data indicated by this button operation and the personal ID data are transmitted from the remote control unit 24 to the remote control operation receiving unit 23' of the interactive television 1. The program control unit 8 forms a television ID by combining the personal ID data and the television ID, adds this television ID and the program ID to the response data, and transmits the data to the response server 3.

In the response server 3, program information for this catalogue request is previously registered together with the television program ID in the television program information database 15. The response processing application program 11 forms a response data file 17 for the catalogue request program from the catalogue request response data. On the basis of the television program ID of the catalogue request program for which the response data file 17 is formed, the totalization processing application program 12 reads out the contents of totalization processing necessary for the catalogue request from the television program information database 15. The authentication processing application 13 is instructed to extract the personal information such as the name and the address of each individual who has requested the catalogue. On the basis of the television ID of each response data, the authentication processing application program 13 extracts the personal information such as the name and the address of each individual who has requested the catalogue from the authentication information database 16.

In the television ID added to each response data, not only the television ID of the interactive television 1 but also the personal ID indicating the individual (the person who has requested the catalogue) who has actually input the response data are registered. Therefore, the personal information such as the name and the address of the person whose has requested the catalogue can be extracted.

From the personal information and the television program IDs, the totalization processing application program 12 forms a catalogue request list showing the correspondence between the types of catalogues and the addresses. Since the catalogue request list need not be transmitted to an IP/SP company in real time, a totalized data file 18 is formed to store these catalogue request lists. The stored catalogue request lists can be transmitted by batch processing to the server of a contracting IP/SP company.

Figure 28:
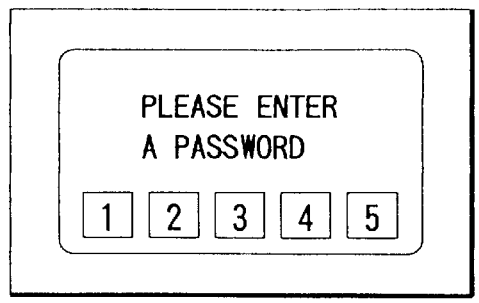
FIG. 28 is a view showing a screen for prompting input of a password in the fifth embodiment.

Also, depending on the contents of a program, a viewer is requested to input a password to the interactive television 1 in order to identify himself or herself. For example, a viewer is requested to input a password when a program such as television shopping accepts an order from the viewer. More specifically, while a television shopping program is being broadcast the program control unit 8 of the interactive television 1 displays a screen for prompting input of a password, as shown in FIG. 28, to instruct a viewer to input a password. A password is determined in the same manner as for a password of a cash card of a bank for each television or each individual and registered in the authentication information database 16. FIG. 27 shows the authentication information database 16 in which a password is registered for each individual.

Figure 29:
FIG. 29 is a view showing the data format of response data in the fifth embodiment.

When a password is input from the remote control switch 24 to the interactive television 1, the program control unit 8 adds the password to the television ID including the television program ID and the personal ID and the response data, as illustrated in FIG. 29, and sends the password and the data to the communication control unit 9. The communication control unit 9 transmits the password and the response data to the response server 3.

In the response server 3, passwords are previously set in respective corresponding locations of the authentication information database 16 on the basis of the personal IDs. Also, processing of "password check" is designated as the contents of response processing or the contents of totalization processing with respect to the program in the television program information database 15. The totalization processing application program 12 executes the "password check".

The response processing application program 11 receives the response data from the interactive televisions 1 and forms a response data file 17 consisting of the television IDs and the response data (orders for articles) on the basis of the contents of response processing for the program read out from the television program information database 15.

The totalization processing application program 12 reads out the contents of totalization processing in which the "password check" is designated from the television program information database 14 by using the television program ID in the response data file 17 as a key. The authentication processing function 13 is informed of a television ID and reads out a password corresponding to the informed television ID from the authentication information database 16. Whether the password registered in the authentication information database 16 agrees with the password added to the response data is checked. If the two passwords agree, it is determined that the order for an article is from the person himself or herself, and so the order is accepted. If the two passwords disagree, on the other hand, it is not determined that the order for an article is from the person himself or herself. Accordingly, the order is rejected.

The personal information such as the name and the address is extracted from each response data which is found to be an order for an article from the person himself or herself, and an order list consisting of these names and addresses is formed for each ordered article. The order lists thus formed for the individual articles are transmitted online to article distributors or the broadcasting station 2.

Note that the above operation is not limited to television shopping. That is, in any program in which it is necessary to check the agreement between response data and a sending person, a viewer is requested to input a password together with response data and the response server 3 checks the password.

In this embodiment as described above, a personal information field is formed in a television ID added to response data in the interactive television 1, and not only a television ID but a personal ID of each person who inputs the response data is transferred to the response server 3. In the authentication information database 16 arranged in the response server 3, personal information is registered on the basis of the television ID consisting of the television ID and the personal ID. Accordingly, it is possible to identify not only one registered representative of the interactive television 1 but also a plurality of other viewers sharing the interactive television 1.

Even when one interactive television 1 is shared by a plurality of persons, therefore, the response server 3 can totalize response data on the basis of the personal information of each individual who has input the response data. This makes accurate totalization processing feasible and increases the reliability of the result of totalization.

In this embodiment, a personal information field is formed in a television ID added to response data in the interactive television 1, and a password input by an individual who has input the response data is transmitted to the response server 3. These passwords are registered in a one-to-one correspondence with television IDs or personal IDs in the authentication information database 16 arranged in the response server 3, and collated in the response server. Accordingly, it is possible to check whether response data sent to the response server 3 is actually input by the person himself or herself. Consequently, it is possible to prevent the inconvenience that a person other than the authorized user intentionally performs a button operation and orders an article against the will of the authorized user. It is also possible to prevent the inconvenience that an order for an article is issued from a wiretapped interactive television 1 without the authorized user knowing it.

Figure 30:
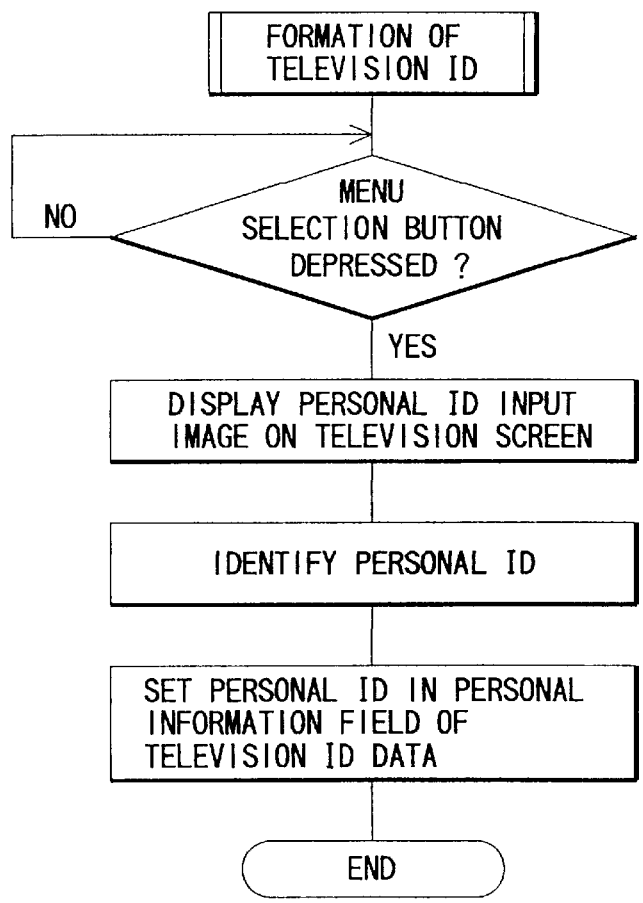
FIG. 30 is a flow chart for forming a television ID in the fifth embodiment.

In the above embodiment, the DIP switches 100 are provided on the rear surface of the remote control switch 24 to input personal ID data to the interactive television 1. However, the program control unit 8 can also input the personal ID in accordance with a flow chart shown in FIG. 30. That is, assuming that a viewer depresses a menu selection button for selecting one program while the program control unit 8 is displaying a menu screen showing a list of programs which can be provided. Upon receiving this input, the program control unit 8 displays a screen, such as shown in FIG. 31, for prompting the viewer to input a personal ID, on the television. When the personal ID data is input by a button operation on the remote control switch 24, this personal ID is set in the personal information field of the television ID. Note that the viewer can input the personal ID at any timing at which the ID can be transmitted together with response data to the response server 3.

(Sixth Embodiment)

FIG. 32 shows functional blocks of a server system according to the sixth embodiment.

In this server system, as in the first embodiment described earlier, an interactive television 1 can be connected to a response server 3 via a public communication network 4. The same reference numerals as in the first embodiment denote parts having the same functions in the sixth embodiment.

A television ID transmitted from the interactive television 1 to the response server 3 includes a television information field and a television maker information field in which a maker ID indicating the television maker is registered. Since the television ID and the maker ID of each interactive television 1 are already known and fixed, these IDs are previously set in the television ID of the interactive television 1. A program control unit 8 of the interactive television 1 adds the television ID include the television ID and the maker ID to response data and transmits the data to the response server 3.

A response processing application program 11 of the response server 3 forms a response data file 17 from the response data and also forms a television ID file 121 from the television IDs added to the response data. A television maker database 122 in which the names of television makers are registered in a one-to-one correspondence with the maker IDs is arranged in the response server 3. A maker classification application program 123 extracts the names of makers corresponding to the maker IDs registered in the television ID file 121 from the television maker database 122 and forms maker television ID files 124 in which the television IDs are classified in accordance with the maker.

The maker television ID files 124 can be used as customer information of the individual television makers. For example, by using the television IDs registered in the maker television ID file 124 of a television maker A as keys, it is possible to extract the corresponding personal information (e.g., the names and the addresses) from an authentication information database 16 and form a list of customers who own televisions made by the television maker A. Also, by totalizing the responders registered in the maker television ID files 124 in accordance with the area and the age by searching the authentication information database 16, the degree of spread of each maker in each area for each age can be checked. In addition, any desired customer information can be formed by combining arbitrary keywords.

In this embodiment as described above, a vender field is formed in the television ID of each interactive television 1, and the maker ID is set in this vender field and transmitted to the response server 3. The response server 3 extracts the television IDs and forms the maker television ID files 124 classified in accordance with the maker. Consequently, customer information of the individual television makers can be obtained by the response server 3.

(Seventh Embodiment)

Figure 33:
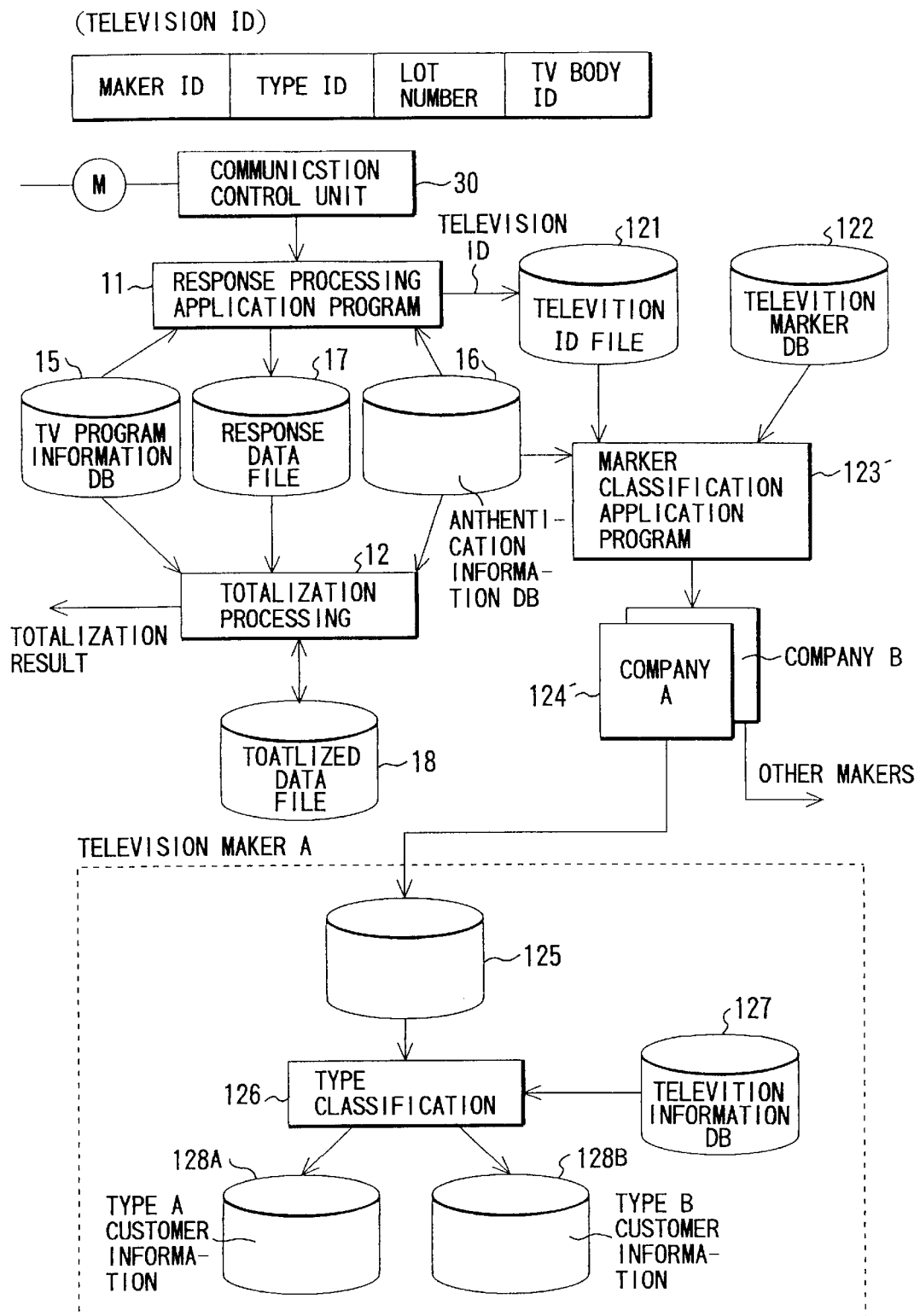
FIG. 33 is a functional block diagram of a server system according to the seventh embodiment.

FIG. 33 shows functional blocks of a server system according to the seventh embodiment.

In this server system, as in the embodiments described above, an interactive television 1 which receives radio waves broadcast from a broadcasting station 2 and displays programs can be connected to a response server 3 via a public communication line 4.

A television ID transmitted from the interactive television 1 to the response server 3 contains a television information field and a vender field in which the television maker sets arbitrary information. In this embodiment, a maker ID indicating the television maker, a type ID indicating the type of a television, and the lot number are set in the vender field.

The television ID is constituted by the vender information and the television ID. The vender information and the television ID are pieces of fixed information and hence can be previously set in the interactive television 1.

A program control unit 8 of the interactive television 1 adds the television ID consisting of the preset television ID and vender information to response data and transmits the data to the response server 3.

A response processing application program 11 of the response server 3 forms a response data file 17 from the response data and also forms a television ID file 121 from the television IDs added to the response data. A maker classification application program 123' classifies the television IDs in accordance with the maker in the same manner as described above. Also, the maker classification application program 123' extracts personal information corresponding to each television ID from an authentication information database 16 and forms maker television ID files 124' in which the television IDs added to the personal information are classified in accordance with the maker.

The maker television ID files 124' thus formed by the response server 3 are transmitted online or delivered to the individual television makers. FIG. 33 shows a case where the television ID file 124' for a company A is transferred to a television maker A.

In the television maker A, the television ID file 124' received from the response server 3 is stored in a file storage 125. A type classification application program 126 reads out the television ID file 124' from the file storage 125 and converts the file 124' into customer information files 128A and 128B in units of television types by referring to a television information database 127.

In the television information database 127, type IDs are set in a one-to-one correspondence with types manufactured by the television maker A. Therefore, the type classification application program 126 classifies the television IDs (including personal information) in the television ID file 124' in accordance with the type ID and retrieves the type corresponding to each type ID from the television information database 127 by using the type ID as a key. As a consequence, the customer information files 128A and 128B in which the data classified according to the type ID are added with the corresponding types can be formed.

In this embodiment as described above, the television ID transmitted from the interactive television 1 to the response server 3 contains the type ID and the lot number of the television, and the response server 3 forms the television ID files 124' for individual makers. Therefore, it is possible to know the name of the maker, the type, and the lot number of a television owned by a viewer who has transmitted the response data to the response server 3 and the personal information of the viewer.

For example, a recall of defective products can be performed by using the television ID file 124'. That is, the corresponding televisions can be found by searching the television ID file 124' by using the type and the lot number as keys, and the names and the addresses of the owners can be found from the personal information added to the television IDs of the found televisions.

Also, each television maker can check the sales of individual television types and the spread of each type in each area for each age by using the television ID file 124' of the company. Necessary market data can be extracted by searching the television ID file 124' by using the combination of arbitrary keywords.

In the above explanation, all programs are multiplexed on radio waves broadcast from the broadcasting station 2 to the interactive television 1. However, as illustrated in FIG. 11 or 13 already described, only the start menu of each program can be transmitted from the broadcasting station 2 to the interactive television 1 or stored in a ROM of the interactive television 1, and actual programs can be provided from the response server 3 to the interactive television 1.

(Eighth Embodiment)

Figure 34:
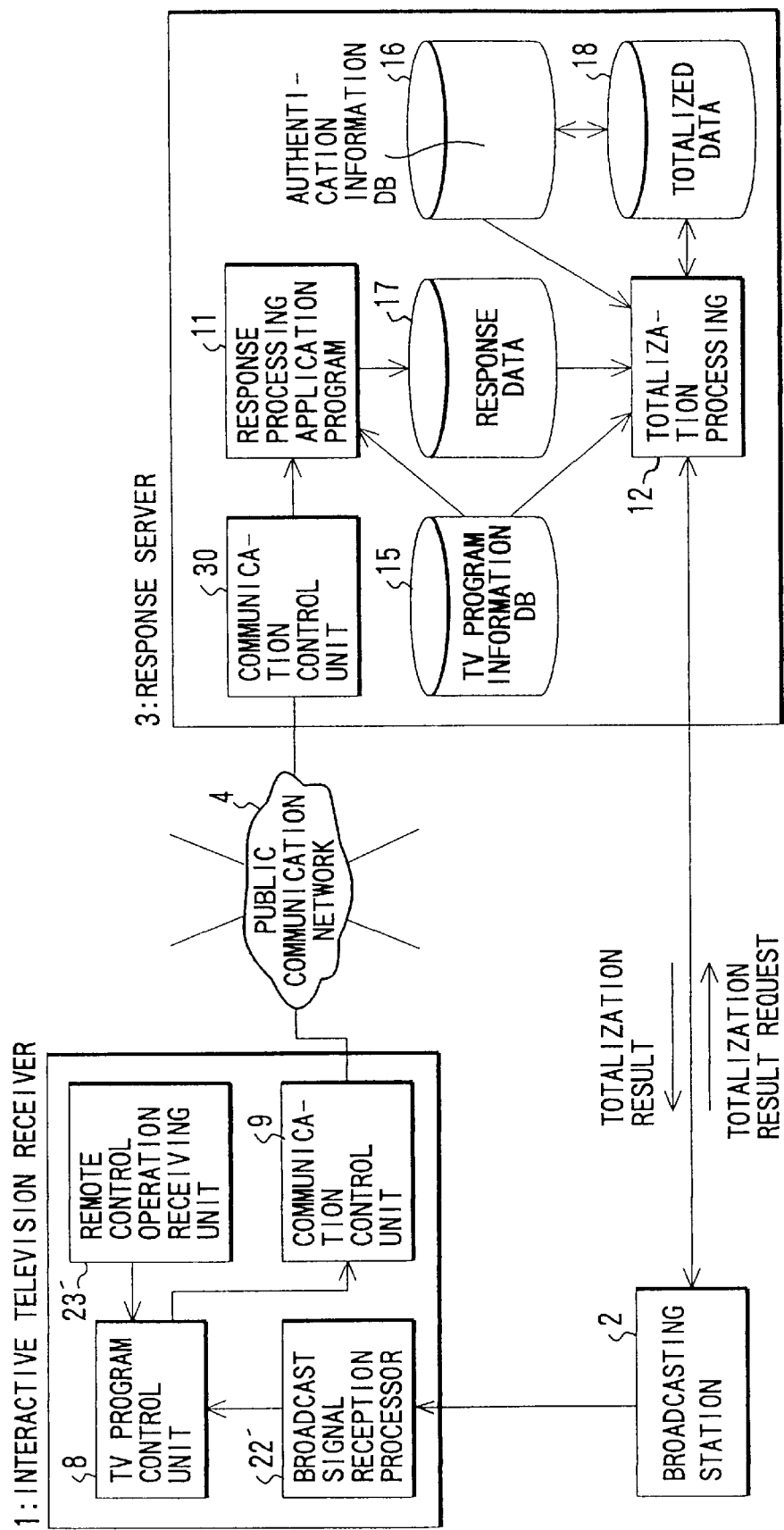
FIG. 34 is a functional block diagram of a television system according to the eighth embodiment.

FIG. 34 shows functional blocks of a television system according to the eighth embodiment. The eighth embodiment basically has the same configuration as the fifth embodiment, and so the same reference numerals as in the fifth embodiment denote parts having the same functions in the eighth embodiment.

The object of this embodiment is the form of a service relating to an interactive television program which displays a question which allows a viewer to pick up one of a plurality of choices on an interactive television 1. Accordingly, a program control unit 8 broadcasts an interactive television program consisting of a plurality of questions each having a plurality of choices, and returns a choice unique number assigned to a choice picked up by a viewer to a response server 3 as response data.

Mores specifically, a broadcasting station 2 transmits to the interactive television 1 a choice unique number table which, as shown in FIGS. 37A to 37C, determines the correspondence between question numbers, choice numbers, and choice unique numbers, for each program. The program control unit 8 converts a choice number picked up by a viewer into a choice unique number by referring to this choice unique number table.

Figure 35:
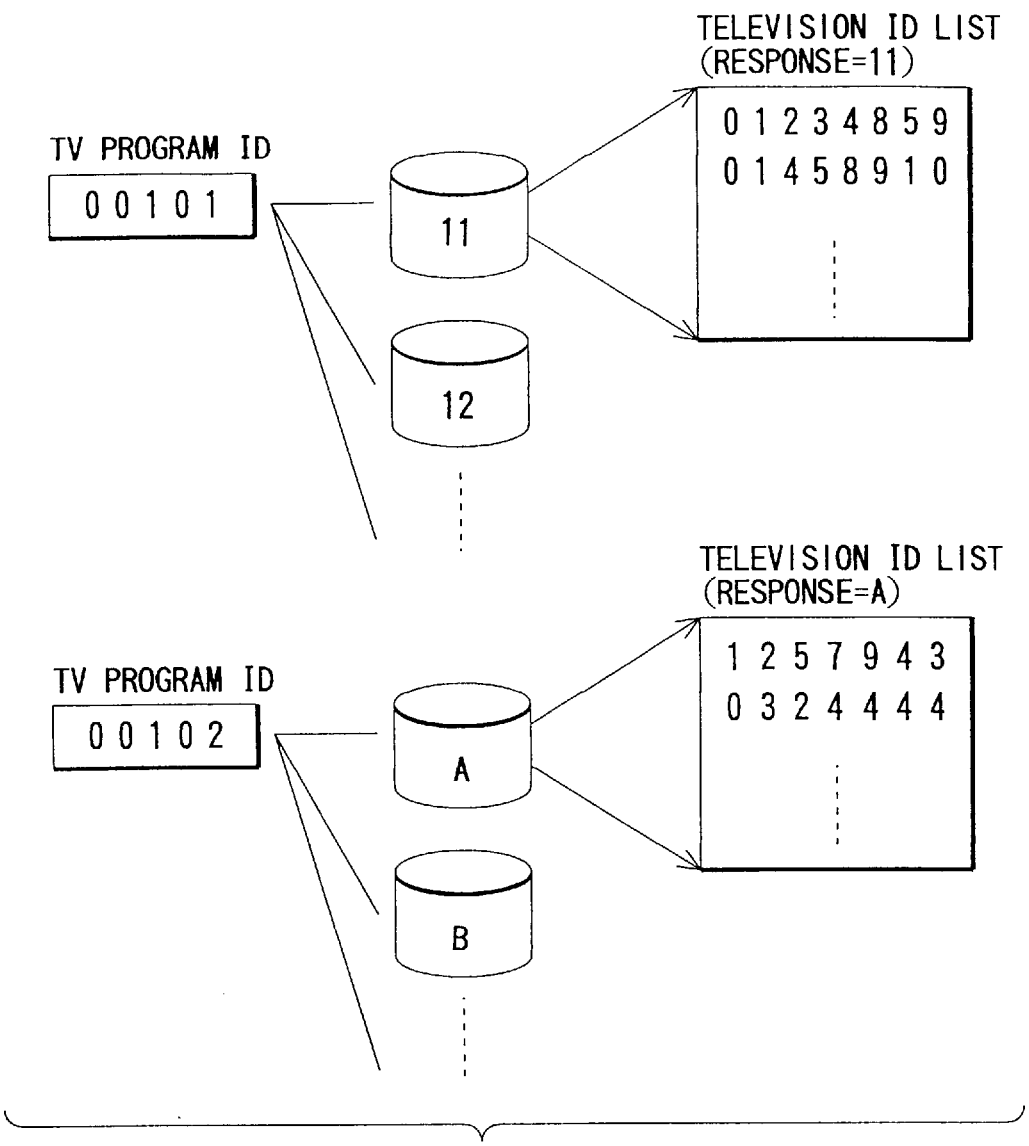
FIG. 35 is a view of a response data list in the eighth embodiment.

A response processing application program 11 processes response data into a predetermined form by referring to a program information database 15. In this embodiment, as illustrated in FIG. 35, a television ID list classified according to the choice unique number is formed in the form of a response data file for each television program ID. A totalization processing application program 12 totalizes the response data files. That is, the totalization processing application program 12 reads out the contents of processing registered in the television program information database 15 for each program and performs totalization processing determined in the contents of processing. In this embodiment, the totalization processing is performed on the basis of the contents of totalization processing defined in a totalization result request stream transmitted online from the broadcasting station 2. The totalization data obtained by the totalization processing application program 12 is stored in a totalized data file 18, read out from the file 18, and transmitted to, e.g., the broadcasting station 2 online or via a certain medium.

The contents of the processing of the server system with the above configuration will be described in detail below.

In this embodiment, a "question program" is multiplexed and broadcast on radio waves from the broadcasting station 2. In the interactive television 1 which has received the broadcast radio waves, a broadcast signal reception processor 22' extracts program data of the question program and applies the data to the program control unit 8.

FIGS. 37A to 37C show examples (examples 1 to 3) of the composition of the "question program".

In examples 1 and 2, a program is composed of five questions whose numbers of choices are 3, 4, 6, 3, and 5. In example 1, serial choice unique numbers are given to choice numbers in sequence from choice number 1 of question number 1. In example 2, a choice unique number of two figures whose units digit is the choice number and tens digit is the question number is given to each choice number. In example 3, a program is composed of five questions whose numbers of choices are 2, 3, 4, 2, and 5. In example 3, choice unique numbers are given to choice numbers in alphabetical order from choice number 1 of question number 1.

Figure 36:
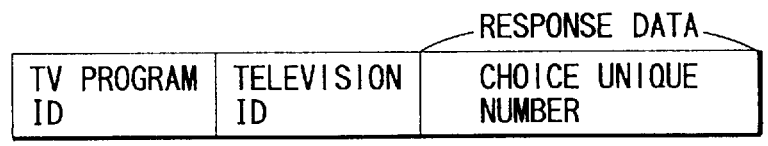
FIG. 36 is a view of the data format of response data in the eighth embodiment.

When a viewer inputs a request for a "question program" from a remote control switch to the interactive television 1, the program control unit 8 executes the program of the "question program" and displays questions and choice numbers on the television screen. The viewer chooses one choice number and transfers the number to the program control unit 8 by a remote operation. The program control unit 8 obtains a choice unique number corresponding to the choice number from the choice unique number table of the question program currently being displayed. The program control unit 8 adds the television program ID and the television ID to the response data (choice unique number), as shown in FIG. 36, and issues a transmission request to a communication control unit 9. Similar processing is executed in each interactive television 1 which has received the response data to the "question program".

In the response server 3, the response data returned from the interactive television 1 is transferred to the response processing application program 11. The response processing application program 11 reads out the contents of processing from the television program information database 15 by using the television program ID added to the response data as a key. In this embodiment, the contents of the response processing are so determined that data files in which the television IDs are classified in accordance with the choice unique number are formed for the individual program IDs, as shown in FIG. 35. A television ID list is formed for each choice unique number by registering the television IDs added to the response data in a data file of the choice unique number.

On the other hand, the broadcasting station 2 transmits a totalization result request online to the totalization processing application program 12 of the response server 3. As described above, desired totalization processing can be performed by the totalization processing application program 12 by previously registering the contents of the totalization processing in the television program information database 15. In this embodiment, however, the broadcasting station 2 directly designates the contents of the totalization processing to the totalization processing application program 12 in real time.

FIG. 38 shows the format of a totalization result request stream transmitted from the broadcasting station 2 to the totalization processing application program 12. The totalization result request stream contains a communication header, a television program ID (UIC), a request object response data number (CN), a response data length (L), a response data character string (R#n), and a processing method (M).

The contents of totalization processing are indicated to the totalization processing application program 12 by this totalization result request stream. For example, to request the totalization processing application program 12 to return the total of the totalized values of response data "11", "12", and "13" in the "question program" with the composition shown in FIG. 37B, a totalization result request stream shown in FIG. 40A is input to the totalization processing application program 12. In accordance with the input totalization result request stream, the totalization processing application program 12 simply adds the totals of the television IDs registered in the data files of choice unique numbers "11", "12", and "13" in question program 1 and transmits the sum to the broadcasting station 1. To request the totalized value of each of the response data "11", "12", and "13", a totalization result request stream shown in FIG. 40B is transmitted to the totalization processing application program 12.

A totalization result request stream shown in FIG. 40C requests a personal list of each response data. Upon receiving this totalization result request, the totalization processing application program 12 reads out the television IDs registered in the data files of the designated response data "11" and "12" from a response data file 17 and extracts the personal information from an authentication information database 16 by using the television IDs as keys. The totalization processing application program 12 forms a personal list for each of the response data "11" and "12" and transfers the lists to a designated destination such as a broadcasting station.

A totalization result request stream shown in FIG. 40D requests a totalized personal list of persons who have transmitted response data "42" and "54" to question numbers 4 and 5 in the program of example 2. By this totalization result request stream, if the right answer to the fourth question is "42" and the right answer to the fifth question is "54", a totalized personal list of persons who have given the right answers to both the fourth and the fifth questions can be formed.

If a totalization result request stream contains a request for a totalized personal list, not all information recorded in the authentication information database 16 is described in the list but only the contents previously registered as program information data in the program information database 15 are returned. If this is the case, the totalization processing application program 12 checks the program ID registered in the totalization result request stream and retrieves the personal information to be described in the personal list from the program information database 15.

In this embodiment as described above, unique numbers (choice unique numbers) are determined for all choices in a question program consisting of questions each having a plurality of choices. A choice unique number corresponding to a choice picked up by a viewer is transmitted as response data, together with the television program ID and the television ID, to the response server 3. The response server 3 forms a data file registering the television IDs for each choice unique number. Accordingly, a desired totalization result can be obtained only by transmitting a totalization result request which is the combination of choice unique numbers and the contents of totalization processing from the broadcasting station 2 to the response server 3.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A television system for providing an interactive television program comprising:

a television for receiving a television multiplexed broadcast radio wave including an interactive television program superimposed thereon; and a server for communicating with the television via a communication network, wherein said television having, display means for displaying the interactive program superimposed on the television multiplexed broadcast radio wave to a viewer;

interactive program control means for controlling a data exchange between the viewer and the interactive television program and for forming response data containing a response input by the viewer to an item that prompts the viewer to input a response on the interactive programs, and television communication control means for controlling communication to the server performed via said communication network, the response data being contained in the transmission data transmitted to the server, said server having, server communication control means for controlling communications to the television performed via the communication network, procedure managing means for storing a response procedure for totalizing the response data received from said television, the response procedure being prepared for the interactive television program beforehand, and procedure executing means for taking out the response procedure from said procedure managing means and totalizing the response data.

2. A server system for communicating with a television via a communication network and totalizing response data generated by a viewer of said television and other viewers regarding respective interactive television programs broadcast to said television and other televisions by broadcast radio waves, comprising:

communication control means for controlling communications from the television via the network, the response data for a particular one of the respective interactive television programs being contained in transmission data transmitted from the television via the network;

procedure managing means for storing a response procedure for totalizing the response data received from said television regarding the particular one of the respective interactive television programs, the response procedure being prepared for the interactive television program beforehand;

arranging means for arranging the response data received from said television and other television to correspond with the response procedure and response data for the particular one of the respective interactive television programs; and procedure executing means for taking out the response procedure from said procedure managing means and totalizing the response data associated with the particular one of the respective interactive television programs, wherein said arranging means arranges the response data in a response data list in which the response data are grouped according to the respective interactive television programs, said procedure managing means manages respective totalizing procedures employed on different response data entries in the response data list, and said procedure executing means totalizes response data for the respective interactive television programs in accordance with the respective totalizing procedures obtained from said procedure managing means.

3. A system according to claim 1, wherein said interactive program control means sets a television program identifier of an interactive television program currently selected in response data containing a response from a viewer transferred from said response receiving means, said procedure managing means manages a procedure of each interactive television program on the basis of the television program identifier predetermined for each of the interactive television program, and said procedure executing means takes out a procedure of an interactive television program relating to response data from said procedure managing means by using the television program identifier set in the response data.

4. A system according to claim 1, wherein said server further comprises:

authentication information managing means for managing authentication informations of users on the basis of user identifiers each of indicating a user of said interactive television set; and authenticating means for searching the authentication information managed under said authentication information managing means by using the user identifier, said interactive program control means sets the user identifier indicating the user of said interactive television in response data containing a response from a viewer transferred from said response receiving means, said procedure managing means manages a procedure including processing using user information, and said procedure executing means instructs said authenticating means to search user information if the procedure take out from said procedure managing means includes processing using the user information.

5. A system according to claim 1, wherein when an interactive television program is selected, said interactive television separates the interactive television program inserted as multiplexed broadcasting into broadcast radio waves from the broadcast radio waves and inputs the interactive television program to said interactive program control means.

6. A system according to claim 1, further comprising a VTR for reproducing a video signal in which an interactive television program for providing additional information of a certain information is inserted into a predetermined region of a video signal indicating contents of the certain information, wherein when the interactive television program is selected while the video signal supplied from said VTR is being reproduced, said interactive television separates the interactive television program from the video signal and inputs the interactive television program control to said interactive program means.

7. A system according to claim 1, wherein said server further comprises:

program storage means for storing screen composition data of an interactive television program composed of a plurality of successive images;

program supplying means for sequentially reading out the screen composition data from said program storage means and forming transmission data in accordance with progress of the interactive television program; and means for transferring the transmission data to said server communication control means by designating an interactive television in which the interactive television program is being executed as a transmission destination, in order to transmit the transmission data to said interactive television, and said television communication control means inputs data received from said server to said interactive program control means if the received data is the screen composition data.

8. A system according to claim 1, wherein said interactive program control means sets data for requesting interactive communication in a header of transmission data for transmitting the response data, when said interactive program control means is supplied with an interactive television program from said server, and said server communication control means transfers data from said interactive television to said program supplying means if the data requesting interactive communication is set in the header of the received data.

9. A system according to claim 4, wherein:

said interactive program control means identifies personal identifiers of one or more persons registered for said interactive television and informs said interactive program control means of a personal identifier of a viewer himself or herself who has returned a response, said interactive program control means uses the personal identifier as the user identifier to be set in the response data, said authentication information managing means manages authentication information of the viewer based on the personal identifier, and said procedure managing means manages a procedure including processing using the authentication information of the viewer.

10. A system according to claim 9, wherein said authentication information managing means manages passwords of viewers in relation to the personal identifiers, and said procedure executing means processes, when a procedure includes password check, response data from a viewer as a valid one if a password transmitted from said interactive television by the viewer agrees with a password of the viewer managed by said authentication information managing means.

11. A system according to claim 1, wherein said interactive program means sets a maker identifier indicating a maker of said television in the response data, and said server further comprises:

classifying means for extracting user identifiers from response data received from said televisions and classifying the user identifiers in accordance with the maker on the basis of the maker identifiers set together with the user identifiers in the response data; and maker information storage means for storing the user identifiers classified in accordance with the maker.

12. A system according to claim 1, wherein said interactive program control means sets at least one of a type identifier indicating a type of said television and a lot number in the response data, said classifying means classifies the type identifiers and the lot numbers set in the response data, together with the user identifiers, in accordance with the maker, and said maker information storage means stores the type identifiers and the lot numbers together with the user identifiers.

13. A system according to claim 1, wherein said interactive program control means gives unique numbers to all choices of questions provided in an interactive television program, in which a plurality of questions each having a plurality of choices are prepared and a viewer picks up one or more choices for each question, and forms response data containing unique numbers corresponding to the choices picked up by the viewer for the question, and said procedure managing means manages a procedure in which a unique number to be subjected to totalization processing is designated.

14. A system according to claim 13, wherein the procedure managed by said procedure managing means includes a unique number as an object of totalization and a method of the totalization of the unique number.

15. A system according to claim 1, wherein said interactive program control means gives unique numbers to all choices of questions provided in an interactive television program, in which a plurality of questions each having a plurality of choices are prepared and a viewer picks up one or more choices for each question, and forms response data containing unique numbers corresponding to the choices picked up by the viewer for the question, said server is connected, via a communication network, to a broadcasting station for providing the interactive television program in which a plurality of questions are prepared, in order to designate a unique number to be subjected to totalization or a unique number as an object of totalization and a method of the totalization of the unique number, and said procedure executing means processes the unique number on the basis of the unique number or of the unique number and the method of the totalization of the unique number directly designated by said broadcasting station.

16. A system according to claim 2, wherein said procedure managing means includes a television program information database for managing a procedure associated with each program on the basis of a television program identifier determined for the television program, and said procedure executing means reads out a procedure from said television program information database by using the program identifier and processes response data in accordance with the readout procedure.

17. A system according to claim 2, further comprising:

authentication information managing means for managing authentication information of a user on the basis of a user identifier indicating a user of said interactive television; and authenticating means for retrieving the authentication information managed by said authentication information managing means by using the user identifier, and said procedure managing means manages a procedure including processing using user information, and said procedure executing means instructs said authenticating means to extract user information if the procedure read out from said procedure managing means includes processing using the user information.

18. A system according to claim 2, further comprising:

program storage means for storing program composition data of a successive image interactive television program composed of a plurality of successive images;

program supply means for sequentially reading out the program composition data from said program storage means and forming transmission data in accordance with progress of the successive image interactive television program; and means for transferring the transmission data to said server communication control means by designating an interactive television in which the successive image interactive television program is being executed as a transmission designation, in order to transmit the transmission data to said interactive television.

19. A system according to claim 18, wherein said communication control means transfers, when response data in which data requesting interactive communication is set in a header is received from an interactive television, the response data to said program supplying means, and holds a line currently established with respect to said interactive television, and said program supplying means transmits program composition information to said interactive television via the line held by said communication control means, and executes a service corresponding to the television program by storing response data transmitted from said interactive television to the program via said line.

20. A system according to claim 17, wherein said authentication information managing means manages authentication information of a viewer himself or herself on the basis of personal identifiers of one or a plurality of persons previously registered in each interactive television, said procedure managing means manages a procedure including processing using the authentication information of the viewer, and said procedure executing means instructs said authenticating means to extract personal information of the viewer if the procedure read out from said procedure managing means includes processing using the personal information of the viewer.

21. A system according to claim 17, wherein said communication control means receives, from an interactive television, response data in which a maker identifier indicating a maker of said interactive television and the user identifier are set, and said server further comprises:

classifying means for extracting user identifiers from response data received from said interactive television and classifying the user identifiers in accordance with the maker on the basis of the maker identifiers set together with the user identifiers in the response data; and maker information storage means for storing the user identifiers classified in accordance with the maker by said classifying means.

* * * * *